US011595907B2

(12) United States Patent
Hosseini et al.

(10) Patent No.: US 11,595,907 B2
(45) Date of Patent: Feb. 28, 2023

(54) UPLINK POWER CONTROL FOR DUAL CONNECTIVITY

(71) Applicant: QUALCOMM Incorporated, San Diego, CA (US)

(72) Inventors: Seyedkianoush Hosseini, San Diego, CA (US); Xiao Feng Wang, San Diego, CA (US); Wanshi Chen, San Diego, CA (US); Tao Luo, San Diego, CA (US); Peter Pui Lok Ang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 16/739,000

(22) Filed: Jan. 9, 2020

(65) Prior Publication Data
US 2020/0229103 A1 Jul. 16, 2020

Related U.S. Application Data

(60) Provisional application No. 62/791,538, filed on Jan. 11, 2019.

(51) Int. Cl.
H04W 52/14 (2009.01)
H04L 5/00 (2006.01)
(Continued)

(52) U.S. Cl.
CPC ........... H04W 52/146 (2013.01); H04L 5/001 (2013.01); H04W 52/34 (2013.01);
(Continued)

(58) Field of Classification Search
CPC ... H04W 52/146; H04W 76/15; H04W 52/34; H04W 52/367; H04W 72/0413; H04L 29/06088; H04L 5/001
See application file for complete search history.

(56) References Cited

U.S. PATENT DOCUMENTS

2018/0324689 A1   11/2018  Li et al.
2020/0068504 A1*  2/2020  Yi ......................... H04W 52/14

FOREIGN PATENT DOCUMENTS

EP   3457734 A1   3/2019
EP   3457769 A1   3/2019
(Continued)

OTHER PUBLICATIONS

International Search Report and Written Opinion—PCT/US2020/013131—ISA/EPO—dated Apr. 9, 2020.

Primary Examiner — Melvin C Marcelo
(74) Attorney, Agent, or Firm — Holland & Hart LLP

(57) ABSTRACT

Methods, systems, and devices for wireless communications are described that provide for power control for dual connectivity. A UE may identify a power control configuration that determines priorities for uplink transmissions over multiple component carriers and one or more base stations. The UE may identify a union of semi-static uplink or flexible transmissions between multiple component carriers employed by one cell group, such as a master cell group and a secondary cell group, and determine a configured power level for the cell group. The UE may then determine whether to transmit an uplink transmission on a cell of another cell group, based on the power control configuration and the configured power level.

52 Claims, 11 Drawing Sheets

(51) Int. Cl.
*H04W 72/04* (2009.01)
*H04W 76/15* (2018.01)
*H04W 52/34* (2009.01)
*H04W 52/36* (2009.01)

(52) U.S. Cl.
CPC ..... *H04W 52/367* (2013.01); *H04W 72/0413* (2013.01); *H04W 76/15* (2018.02)

(56) References Cited

FOREIGN PATENT DOCUMENTS

WO    WO-2017195463 A1    11/2017
WO    WO-2017195474 A1    11/2017

* cited by examiner

UPLINK POWER CONTROL FOR DUAL CONNECTIVITY

CROSS REFERENCE

The present application for patent claims the benefit of U.S. Provisional Patent Application No. 62/791,538 by HOSSEINI et al., entitled "UPLINK POWER CONTROL FOR DUAL CONNECTIVITY," filed Jan. 11, 2019, assigned to the assignee hereof, and expressly incorporated herein.

BACKGROUND

The following relates generally to wireless communications, and to uplink power control for dual connectivity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support dual connectivity (DC) power control. Generally, the described techniques provide for DC power control for a user equipment (UE) configured for new radio—new radio DC (NN-DC). In some examples, the master cell group (MCG) may be prioritized for power control in uplink transmissions and in some examples, both the MCG and the secondary cell group (SCG) may have the same priority for power control in uplink transmissions. The power control procedure for both cases are discussed herein.

In some examples, the UE may receive a power control configuration for uplink transmissions on a first cell group and on a second cell group, wherein the UE is configured for dual connectivity and to communicate with the first cell group and the second cell group. The UE may additionally identify an uplink transmission for one or more symbol periods on a component carrier of the second cell group and may identify, for the one or more symbol periods, a number of symbol periods on the first cell group indicated as semi-static uplink or flexible by a set of time or frequency division duplexing configurations corresponding to the first cell group. The UE may determine, for the first cell group, a first configured power level for the one or more symbol periods, and the UE then may determine, based at least in part on the determined first configured power level and the received power control configuration, whether to perform the uplink transmission during the one or more symbol periods on the component carrier of the second cell group.

A method of wireless communication at a UE is described. The method may include receiving a power control configuration for uplink transmissions on a first cell group and on a second cell group, wherein the UE is configured for dual connectivity and to communicate with the first cell group and the second cell group, identifying, for the one or more symbol periods, a number of symbol periods on the first cell group indicated as semi-static uplink or flexible by a set of time or frequency division duplexing configurations corresponding to the first cell group, determining, for the first cell group, a first configured power level for the one or more symbol periods, and determining, based on the determined first configured power level and the received power control configuration, whether to perform the uplink transmission during the one or more symbol periods on the component carrier of the second cell group.

An apparatus for wireless communication at a UE is described. The apparatus may include a processor, memory in electronic communication with the processor, and instructions stored in the memory. The instructions may be executable by the processor to cause the apparatus to receive a power control configuration for uplink transmissions on a first cell group and on a second cell group, wherein the UE is configured for dual connectivity and to communicate with the first cell group and the second cell group, identify an uplink transmission for one or more symbols periods on a component carrier of the second cell group, identify, for the one or more symbol periods, a number of symbol periods on the first cell group indicated as semi-static uplink or flexible by a set of time or frequency division duplexing configurations corresponding to the first cell group, determine, for the first cell group, a first configured power level for the one or more symbol periods, and determine, based on the determined first configured power level and the received power control configuration, whether to perform the uplink transmission during the one or more symbol periods on the component carrier of the second cell group.

Another apparatus for wireless communication at a UE is described. The apparatus may include means for receiving a power control configuration for uplink transmissions on a first cell group and on a second cell group, wherein the UE is configured for dual connectivity and to communicate with the first cell group and the second cell group, identifying an uplink transmission for one or more symbols periods on a component carrier of the second cell group, identifying, for the one or more symbol periods, a number of symbol periods on the first cell group indicated as semi-static uplink or flexible by a set of time or frequency division duplexing configurations corresponding to the first cell group, determining, for the first cell group, a first configured power level for the one or more symbol periods, and determining, based on the determined first configured power level and the received power control configuration, whether to perform the uplink transmission during the one or more symbol periods on the component carrier of the second cell group.

A non-transitory computer-readable medium storing code for wireless communication at a UE is described. The code may include instructions executable by a processor to receive a power control configuration for uplink transmissions on a first cell group and on a second cell group, wherein the UE is configured for dual connectivity and to communicate with the first cell group and the second cell group, identify an uplink transmission for one or more symbols periods on a component carrier of the second cell group, identify, for the one or more symbol periods, a number of symbol periods on the first cell group indicated as semi-static uplink or flexible by a set of time or frequency division duplexing configurations corresponding to the first cell group, determine, for the first cell group, a first configured power level for the one or more symbol periods, and determine, based on the determined first configured power level and the received power control configuration, whether to perform the uplink transmission during the one or more symbol periods on the component carrier of the second cell group.

Some examples of the method, apparatuses, and non-transitory computer-readable medium described herein may further include operations, features, means, or instructions for determining a second configured power level for the one or more symbol periods on the second cell group, identifying that a sum of the determined first configured power level and the determined second configured power level may be less than or equal to a power level threshold for the one or more symbol periods, and performing power control for the second cell group independent of performing power control for the first cell group for the one or more symbol periods.

In some examples of the method, apparatuses, and non-transitory computer-readable medium described herein, performing power control for the second cell group independent of performing power control for the first cell group for the one or more symbol periods may include operations, features, means, or instructions for performing power control for the first cell group according to a carrier aggregation power control scheme; or, performing power control for the second cell group according to the carrier aggregation power control scheme; or, and a combination thereof.

In some examples of the method, apparatuses, and non-transitory computer-readable medium described herein, determining whether to perform the uplink transmission may include operations, features, means, or instructions for determining to abstain from performing the uplink transmission during the one or more symbol periods based on identifying that one or more symbol periods may be indicated as semi-static uplink or flexible during the one or more symbol periods for at least one component carrier of the first cell group.

Some examples of the method, apparatuses, and non-transitory computer-readable medium described herein may further include operations, features, means, or instructions for identifying, based on the received power control configuration, a first set of power level thresholds for the first cell group and the second cell group, identifying, based on the received power control configuration, a second set of power level thresholds for the first cell group and the second cell group, where a sum of the first set of power level thresholds may be greater than a sum of the second set of power level thresholds, and determining whether to perform the uplink transmission based on one of the first set of power level thresholds or the second set of power level thresholds, and the determined first configured power level.

Some examples of the method, apparatuses, and non-transitory computer-readable medium described herein may further include operations, features, means, or instructions for performing power control for one of the first cell group or the second cell group according to the first set of power level thresholds based on identifying zero symbol periods indicated as semi-static uplink or flexible for each component carrier of an other one of the first cell group or the second cell group during the one or more symbol periods.

Some examples of the method, apparatuses, and non-transitory computer-readable medium described herein may further include operations, features, means, or instructions for performing power control for one of the first cell group or the second cell group according to the second set of power level thresholds based on identifying one or more symbol periods indicated as semi-static uplink or flexible for each component carrier of an other one of the first cell group or the second cell group during the one or more symbol periods.

In some examples of the method, apparatuses, and non-transitory computer-readable medium described herein, a power level threshold of the first set of power level thresholds corresponding to the first cell group may be a same power level threshold as a power level threshold of the second set of power level thresholds for the first cell group, and a power level threshold of the first set of power level thresholds corresponding to the second cell group may be a different power level threshold as a power level threshold of the second set of power level thresholds for the second cell group.

Some examples of the method, apparatuses, and non-transitory computer-readable medium described herein may further include operations, features, means, or instructions for identifying that at least one component carrier of the first cell group may be configured according to a frequency division duplexing configuration, and determining that at least one symbol period of the uplink frequency resources of the frequency division duplexing configuration may be unavailable for uplink transmissions on the at least one component carrier.

Some examples of the method, apparatuses, and non-transitory computer-readable medium described herein may further include operations, features, means, or instructions for identifying a time division duplexing configuration indicating uplink resources for acknowledgment or data channel transmissions on the uplink frequency resources of the at least one component carrier, and transmitting an acknowledgment or a data channel signal according to the identified time division duplexing configuration.

In some examples of the method, apparatuses, and non-transitory computer-readable medium described herein, the first cell group comprises a first set of component carriers, and the second cell group comprises a second set of component carriers.

In some examples of the method, apparatuses, and non-transitory computer-readable medium described herein, the first cell group and the second cell group may be in a same radio frequency spectrum band.

DETAILED DESCRIPTION

Figure 1:
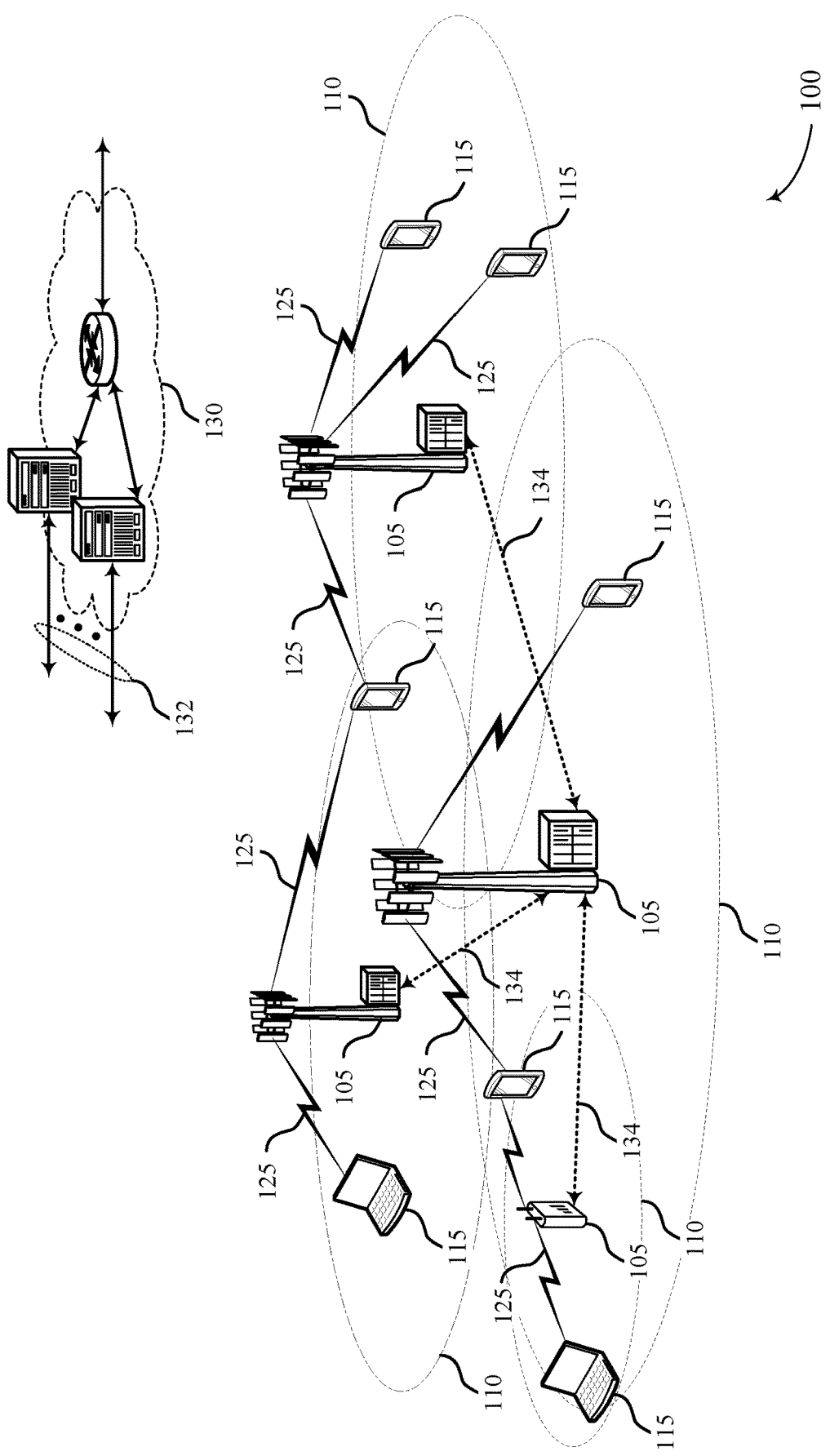
FIG. 1 illustrates an example of a system for wireless communications that supports power control for dual connectivity in accordance with aspects of the present disclosure.

In some wireless communications systems, a user equipment (UE) may be configured for dual connectivity (DC) and may communicate with two or more base stations. The base stations and the UE may communicate with one another via multiple component carriers. In some examples, a first base station may communicate with the UE via a first set of component carriers which may be a master cell group (MCG) and a second base station may communicate with the UE via a second set of component carriers which may be a secondary cell group (SCG). In some examples, each of the MCG and the SCG may include one or more sets of component carriers. Each cell group and/or set(s) of component carriers may communicate transmissions between the UE and the base stations within specified frequency ranges. In some examples, a first frequency range or operating band, FR1, may be in the approximate frequency range of 450 MHz-6000 MHz and the second frequency range or operating band, FR2, may be in the approximate frequency range of 24250 MHz-2600 MHz.

The MCG and the SCG may both communicate uplink transmissions from the UE to the base station within FR1 or may both communicate uplink transmissions from the UE to the base station within FR2, or the MCG may communicate within FR1 and the SCG may communicate within FR2 or vice versa. FR1 and FR2 may have different maximum power definitions and the power control operation for the MCG and the SCG may be performed independently of one another. However, the UE may have a maximum power for uplink transmissions that is shared across all cells, and between all cell groups. The independent power control operations may decouple the power decisions made for each of the cells, making it difficult to stay within the UE uplink transmission power constraints as the cell groups are not coordinated in terms of transmission power. In some examples, the cell groups may include serving component carriers all within FR1 or all within FR2. In this example, a joint maximum power limitation may be considered. Additionally, the UE may support both synchronous and asynchronous DC.

As such, in some circumstances, a UE may fail to appropriately coordinate the uplink transmissions in compliance with maximum transmission power requirements. Accordingly, improved power control techniques in dual connectivity are desired.

One technique for power control for dual connectivity may include the UE receiving a power control configuration for uplink transmissions on a first cell group and on a second cell group, where the UE is configured to communicate with a first base station on the first cell group and is configured to communicate with a second base station on the second cell group. The UE may additionally identify an uplink transmission for one or more symbol periods on a component carrier of the second cell group and may identify, for the one or more symbol periods, a number of symbol periods on the first cell group indicated as semi-static uplink or flexible by a set of time or frequency division duplexing configurations corresponding to the first cell group. The UE may determine, for the first cell group, a first configured power level for the one or more symbol periods, and the UE may then determine, based at least in part on the determined first configured power level and the received power control configuration, whether to perform the uplink transmission during the one or more symbol periods on the component carrier of the second cell group.

Aspects of the disclosure are initially described in the context of a wireless communications system. Example wireless communication systems for DC power control, uplink/downlink patterns illustrating power control procedures for DC power control, and block diagrams for implementing techniques discussed herein are described. Aspects of the disclosure are further illustrated by and described with reference to apparatus diagrams, system diagrams, and flowcharts that relate to DC power control.

FIG. 1 illustrates an example of a wireless communications system 100 that supports uplink power control for dual connectivity in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both. Component carriers may communicate transmissions between base stations and UEs for master cell groups and secondary cell groups. In some examples, a UE may be communicating with two or more base stations and when transmitting uplink transmissions may determine a power control configuration for the uplink transmissions.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

UE 115 may have a maximum power for uplink transmissions to one or more base stations. In some examples, UE 115 may be configured for DC and may be communicating with at least two base stations, in which each base station may serve one or more component carriers. A first base station may communicate via an MCG which may include one or more sets of component carriers and a second base station may communicate via an SCG which may include one or more sets of component carriers. In order for UE 115 to comply with the maximum power constraint, a power control procedure for determining uplink transmissions may be implemented.

In a first power control procedure, the SCG may communicate the uplink transmission if the UE 115 determines that no uplink may be transmitted on partially or fully overlapping symbols of the MCG (e.g., because all symbols in symbol periods corresponding to the uplink transmission are semi-statically configured as downlink for the MCG). In the first power control procedure, the component carriers of the MCG may have a maximum power and the component carriers of the SCG may have a maximum power, and generally, MCG transmissions may be given a higher priority, which in some examples may be subject to an exception. The exception may include the circumstance in which a frequency division duplexed (FDD) cell is in the MCG. With this exception, the MCG may not be allowed to transmit on all uplink symbols so that a space may be available for SCG transmissions. For example, the FDD cell may be restricted from transmitting on certain symbols of the uplink frequency resources of the FDD cell that would otherwise be used for uplink transmissions. In some examples, a TDD or TDD-like pattern may be superimposed on the FDD cell to allow for uplink transmission on one or more cells of the SCG. Additionally, the TDD or TDD-like pattern may be UE-specific, may be different on different FDD carriers, or both.

In a second power control procedure, the maximum power configured for uplink transmissions on a cell group may depend on whether there may be an overlap between two or more cell group uplink transmissions or not. Flexible symbols may be effectively treated as uplink symbols for purposes of determining a configured power for uplink transmissions according to the power control procedure. In the second power control procedure, the MCG and the SCG may have two sets of maximum configured powers. For example, from a first set of maximum configured powers there may be a maximum power for the MCG and a maximum power for the SCG. Additionally, from a second set of maximum configured powers there may be a maximum power for the MCG and a maximum power for the SCG (with the maximum power for the MCG and the maximum power for the SCG of the second set of maximum configured powers being apart from the maximum power for the MCG and the maximum power for the SCG of the first set of maximum configured powers). The appropriate set of maximum configured power may be determined by identifying a union of the semi-static uplink or flexible symbols on one of the MCG or SCG corresponding to the potential or candidate uplink transmission to be transmitted on the SCG and MCG, respectively.

One technique for power control for dual connectivity may include the UE receiving a power control configuration for uplink transmissions on a first cell group and on a second cell group, where the UE is configured to communicate with a first base station on the first cell group and is configured to communicate with a second base station on the second cell group. The UE may additionally identify an uplink transmission for one or more symbol periods on a component carrier of the second cell group and may identify, for the one or more symbol periods, a number of symbol periods on the first cell group indicated as semi-static uplink or flexible by a set of time or frequency division duplexing configurations corresponding to the first cell group. The UE may determine, for the first cell group, a first configured power level for the one or more symbol periods, and the UE then may determine, based at least in part on the determined first configured power level and the received power control configuration, whether to perform the uplink transmission during the one or more symbol periods on the component carrier of the second cell group.

This technique may further include determining a second configured power level for the one or more symbol periods on the second cell group. The UE may identify that a sum of the determined first configured power level and the determined second configured power level is less than or equal to a power level threshold for the one or more symbol periods. Further, the UE may perform power control for the second cell group independent of performing power control for the first cell group for the one or more symbol periods.

Figure 2:
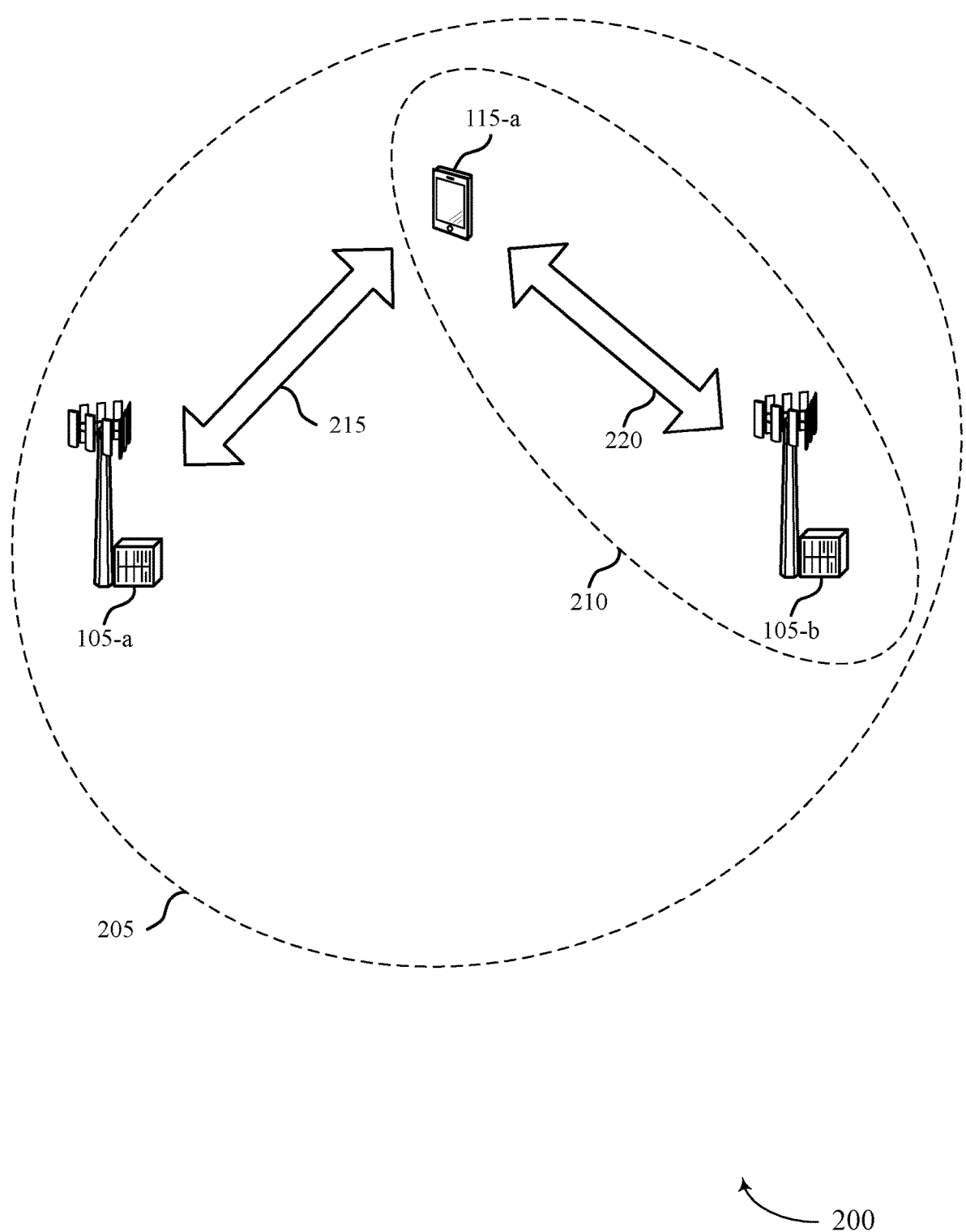
FIG. 2 illustrates an example of a system for wireless communication 200 that supports uplink power control for dual connectivity in accordance with aspects of the present disclosure.

FIG. 2 illustrates an example of a wireless communications system 200 that supports power control for dual connectivity in accordance with aspects of the present disclosure. In some examples, wireless communications system 200 may implement aspects of wireless communication system 100. In the example of FIG. 2, the wireless communications system 200 may include a first base station 105-a and a second base station 105-b, which may be examples of a base station 105 of FIG. 1. The wireless communications system 200 may also include a UE 115-a, which may be an example of UE 115 of FIG. 1.

As illustrated in the example of FIG. 2, the UE 115-a may be configured for DC and the first base station 105-a may have a coverage area 205 and may be in communication with UE 115-a via an MCG 215. The second base station 105-b may have a coverage area 210 and also may be in communication with UE 115-a via an SCG 220. In some examples, the MCG 215 and the SCG 220 may both be associated with the same radio access technology (RAT), such as a new radio (NR) RAT, which may be referred to herein as NR-NR-dual connectivity (NN-DC).

In some examples, UE 115-a may have a maximum power for uplink transmission which may be shared across all cells and between all cell groups and UE 115-a may not exceed the maximum power for uplink transmissions. As such, the uplink transmissions for the cell groups, such as for MCG 215 and SCG 220, may be coordinated so that the total power between the two cell groups may not exceed the maximum power of UE 115-a.

Each cell group may communicate with the UE within specified frequency ranges such as FR1 and FR2. In some examples, FR1 and FR2 may have different maximum power configurations and when operating in NN-DC, the power control operation of the cell groups may be performed independently. Since there may be no single maximum power constraint for FR1 and FR2, communicating in different frequency ranges may affect the power control schemes or procedures for uplink transmissions from UE 115-a.

The MCG and the SCG may both communicate uplink transmissions from UE 115-a to the base stations 105-a and 105-b within FR1, or may both communicate uplink transmissions from the UE to the base stations 105-a and 105-b within FR2, or the MCG may communicate within FR1 and the SCG may communicate within FR2 or vice versa. Because FR1 and FR2 may have different maximum power definitions, the power control operation for the MCG and the SCG may be performed independently of one another. The independent power control operations may decouple the power decisions made for each of the cells, making it difficult to stay within the UE uplink transmission power constraints as the cell groups are not coordinated in terms of transmission power. Additionally, the UE may support both synchronous and asynchronous DC, and the techniques described herein may apply to asynchronous as well as synchronous dual connectivity.

In one example of FIG. 2, UE 115-a may be communicating multiple uplink transmissions to both the first base station 105-a and the second base station 105-b via multiple carriers per MCG and per SCG. The multiple transmissions and carriers per cell group, may cause UE 115-a to exceed the maximum power for uplink transmissions.

Although other power control schemes may address maximum power constraints for UE 115-a, those power control schemes may not be applicable to or practical for NN-DC. For example, the carrier aggregation (CA) power scheme may prioritize power allocation for transmissions. In some examples of CA, assuming the same priority order and for operation with CA, UE 115-a may prioritize power allocation for transmissions on the primary cell of the MCG or the SCG over transmission on a secondary cell. The UE may prioritize power allocation for transmission on the PCell over transmissions on the PSCell.

Additionally, for CA and in the case of the same priority order and for operation with two UL carriers, the UE may prioritize power allocation for transmissions on the carrier in which the UE is configured to transmit a control channel transmission (e.g., on a physical uplink control channel (PUCCH)). If the PUCCH is not configured for either of the two UL carriers, the UE may prioritize power allocation for transmissions on the non-supplementary UL carrier or the UL carrier with the primary cell, which may be either of the MCG or SCG. Even though power allocation for uplink transmission may be addressed for CA, the same power allocation may not be employed with NN-DC. For CA, a single scheduler may be employed, which may schedule the uplink transmissions and accordingly may track when uplink channels overlap and the corresponding total power. In DC, the same power allocation scheme may not be used as the base stations and component carriers may not be coordinated such that decisions for power allocation and uplink channel overlap may be made independently, and thus not tracked by the UE. Further, if the CA power allocation scheme were employed in DC, one base station transmission may always be dropped due to the prioritization of transmissions on the PCell (e.g., or the MCG) over transmission on the PSCell (e.g., or the SCG).

In some examples, UE 115-a may have a maximum transmission power, and due to this maximum transmission power, the combined uplink transmissions to the base stations from UE 115-a may not be allowed to exceed the maximum transmission power of UE 115-a. Additionally, due to the power control operation of the cell groups being performed independently, the cell groups may not have the ability to track whether the uplink channels overlap, and thus, may not be able to comply with the maximum transmission power requirements. Accordingly, performing independently power control operations across all cell groups while complying with the maximum transmission power requirements is desirable.

In some examples, a UE may receive a power control configuration for uplink transmissions on a first cell group and on a second cell group, wherein the UE is configured to communicate with a first base station on the first cell group and is configured to communicate with a second base station on the second cell group. The UE may identify an uplink transmission for one or more symbol periods on a component carrier of the MCG. In some examples, the UE may identify an uplink transmission on the MCG and the transmission may be one or more symbol periods. The UE may then identify a union of a number of symbol periods on the MCG as semi-static uplink or flexible by a set of time or frequency division duplexing configurations corresponding to the MCG. Identifying a union of symbol periods on the MCG may be identifying semi-static uplink or flexible symbols for the MCG that at least partially overlap during the time duration of the uplink symbol for the SCG. The UE may determine for the MCG, a first configured power level for the symbol periods of the number of symbol periods and then may determine based on the first configured power level, whether to perform the uplink transmission during the one or more symbol periods for the SCG.

In some examples, when the UE is determining whether to perform the uplink transmission, the UE may further determine to abstain from performing the uplink transmission during the one or more symbol periods. This determination may be based on identifying one or more uplink and/or flexible symbol periods of the MCG occurs during the one or more symbol periods of the SCG. The one or more uplink and/or flexible symbol periods may also be semi-statically configured.

In some examples, the UE may determine a second configured power level for the symbol periods on the SCG. The UE may identify that the sum of the previously determined first and second configured power levels may be less than or equal to a power level threshold and then may perform power control for the SCG independent of performing power control for the MCG for the one or more symbol periods.

In some examples, the UE may identify that at least one component carrier of the MCG is configured according to an FDD configuration and may determine that at least one symbol period of the uplink frequency resources of the FDD configuration are unavailable for uplink transmission on the at least one component carrier. The UE may then identify a TDD configuration indicating uplink resources for acknowledgment of data channel transmissions on the uplink frequency resources of the at least one component carrier and transmit the acknowledgment or a data channel signal according to the identified TDD configuration.

In some examples of a first power control procedure, a power control process for UE 115-a which may be configured for DC, may include an uplink transmission on an SCG cell only if UE 115-a confirms that no uplink can be transmitted on partially or fully overlapping symbols of the MCG. Generally, a higher priority is given to transmissions on MCG over SCG, with the exception when an FDD cell is in the MCG, the MCG may not transmit on all uplink symbols in order to create a "space" or some available frequency range for the SCG transmissions.

In this example of the first power control procedure, UE 115-a may be configured with a maximum configured power (P_NN) for all CCs in MCG, in which the MCG may have a maximum configured power for all CCs in the MCG (P_NR1) and may additionally be configured with a maximum configured power for all CCs in the SCG (P_NR2). Because the MCG may be FDD and/or TDD, the FDD MCG cells may always be configured to communicate uplink transmissions, and thus the SCG may not have an opportunity to transmit if the MCG transmissions are always prioritized over SCG transmissions. Using the previously mentioned exception to the MCG prioritization, the FDD cell present in the MCG may present a circumstance that prevents the MCG from transmitting on all uplink symbols to create some symbols for the SCG transmissions. Further for FDD cells in the MCG, a UE-specific TDD uplink/downlink pattern may be configured so that uplink transmissions on the FDD cell of the MCG, such as downlink hybrid automatic repeat requests (HARQs) and/or physical uplink shared channel (PUSCH) transmissions, may be confined within a subset (in time) of the FDD uplink frequency resources.

Further to this example of the first power control procedure, in a first case, if the sum of P_NR1 and P_NR2 is less than or equal to P_NN, the power control for UE 115-a may be similar to the previously discussed power control for CA, and additional considerations may not need to be taken into account. Additionally for uplink transmissions on a serving cell of the MCG, UE115-a may select the maximum power as P_NR1. UE 115-a may not anticipate (e.g., because configuring base stations may be restricted from making such configurations) the sum power of all serving cells or component carriers of all the cell groups to exceed P_NN.

In the second case of the first power control procedure, one factor taken into consideration for power configuration, when considering a potential uplink transmission on the SCG, may include identifying a union of all symbols over a time duration, which in some cases may be a time transmission interval (TTI), marked as semi-static uplink or flexible across all CCs of the MCG by SIB1 or UE-specific RRC signaling. By identifying the union of all symbols, UE 115-a may identify partially or fully overlapping semi-static uplink or flexible symbols between the MCG and the SCG. In this second case, UE 115-*a* may fail to transmit the uplink transmission or may classify this case as an error case and may not transmit on a symbol of the SCG that is overlapping with the symbol of the MCG that is designated for an uplink transmission.

Additionally in the second case, if UE 115-*a* attempts to identify a union of all symbols during a time duration marked as uplink symbols or flexible symbols across all CCs of the MCG and instead identifies that the uplink of the SCG overlaps with the semi-static downlink symbols of the MCG, then UE 115-*a* may transmit the uplink transmission on the SCG and may comply with P_NR2. In some examples, for an uplink transmission in either of the MCG or the SCG, UE 115-*a* may take the union of all corresponding symbols across all CCs of the appropriate cell group and determine the semi-statically configured direction. This may be done on a per-symbol basis for an uplink channel (e.g., symbol-by-symbol decision making) or may be done for the entire duration of the uplink channel all at once. In some cases, the uplink channel may be a PUSCH.

In some examples, this scheme may be suitable for synchronous DC as the slots may not move with respect to one another in the time domain. Thus, based on the semi-statically configured slot format of the MCG or the SCG, UE 115-*a* may be able to determine which symbol may be overlapping with other symbols of the other cell group and the direction of each of the symbols. For synchronous deployments, base stations 105-*a* and 105-*b* may exchange the semi-static slot format configurations to manage the scheduling decisions. Accordingly, from the perspective of UE 115-*a*, the set of symbols colliding at each occasion and the directions may be fixed. Hence, the semi-static slot format configurations of the two serving cells may be exchanged once between the processing units of each cell group.

In some examples, for asynchronous deployment, the slots of the cell groups may be shifted or moving relative to each other. Thus, when processing uplink transmissions in the MCG for example and at a given time, UE 115-*a* may check for overlapping symbols on the SCG and the corresponding direction. This may be performed for each transmission. Hence, UE 115-*a* may exchange this information across the processing units allocated to each cell group (e.g., track the changes and exchange the information), and the same or a similar solution may be applied to asynchronous DC. Further, in asynchronous deployments, the set of symbols colliding at each uplink occasion may not be fixed since the uplink slots may be shifted relative to each other in the time domain. Hence, coordinating the slot format configurations at the base station side may not be possible. From the perspective of UE 115-*a*, the list of the symbols that may potentially collide may change as the slots move around relative to each other in the time domain. In such a case, for each uplink transmission, UE 115-*a* may assume that an uplink transmission is taking place on the other cell group and may selects its power from the other set.

In some examples of a second power control procedure, the maximum power configured for uplink transmission on the MCG or SCG may depend on whether there may be an overlap between the MCG and SCG uplink transmissions or not. Alternatively to the previously discussed examples, both of the MCG and the SCG may have the same priority. In this example, the SCG may have the ability to communicate the uplink transmission to the second base station 105-*b* and may not be conflicted or crowded out by the MCG uplink transmissions.

In some examples of the second power control procedure, the MCG and SCG may have two sets of maximum configured powers. The first set of maximum configured power may include a maximum configured power for MCG, P_NR1, and a maximum configured power for SCG, P_NR2, in which the sum of P_NR1 and P_NR2 may be equal to or smaller than P_NN. The second set of maximum configured power may include a maximum configured power for MCG, P_NR1', and a maximum configured power for SCG, P_NR2', in which the sum of P_NR1' and P_NR2' may be smaller than P_NN. The second set of maximum configured power may alternatively be r1*P_NR1 and r2*P_NR2, where r1 and r2 may be scalers and set to values such that the sum of r1*P_NR1 and r2*P_NR2 may be less than or equal to P_NN. In some examples, r1 and r2 may be equal to one another, may be different from one another, or may be differently configured. For uplink transmissions on a serving cell of the SCG, UE 115-*a* may identify the union of the overlapping symbols of all serving cells of the other group. If the identified union includes symbols with corresponding directions which may be semi-statically downlink, UE 115-*a* may select the maximum power from the first set. Otherwise, the maximum power may be selected from the second set.

Additionally or alternatively for the second power control procedure, only one of the scalers may be used such as r2 for SCG. In some examples, the MCG maximum configured power may be P_NR1 and the SCG maximum configured power may be selected from the first set of maximum configured power and may be P_NR2 or may be selected from the second set of maximum configured power and may be r2*P_NR2. This example may ensure that the uplink transmissions may be transmitted concurrently on both MCG and the SCG, but the MCG operation may not be impacted by any overlapping uplink symbols or flexible symbols.

Figure 3:
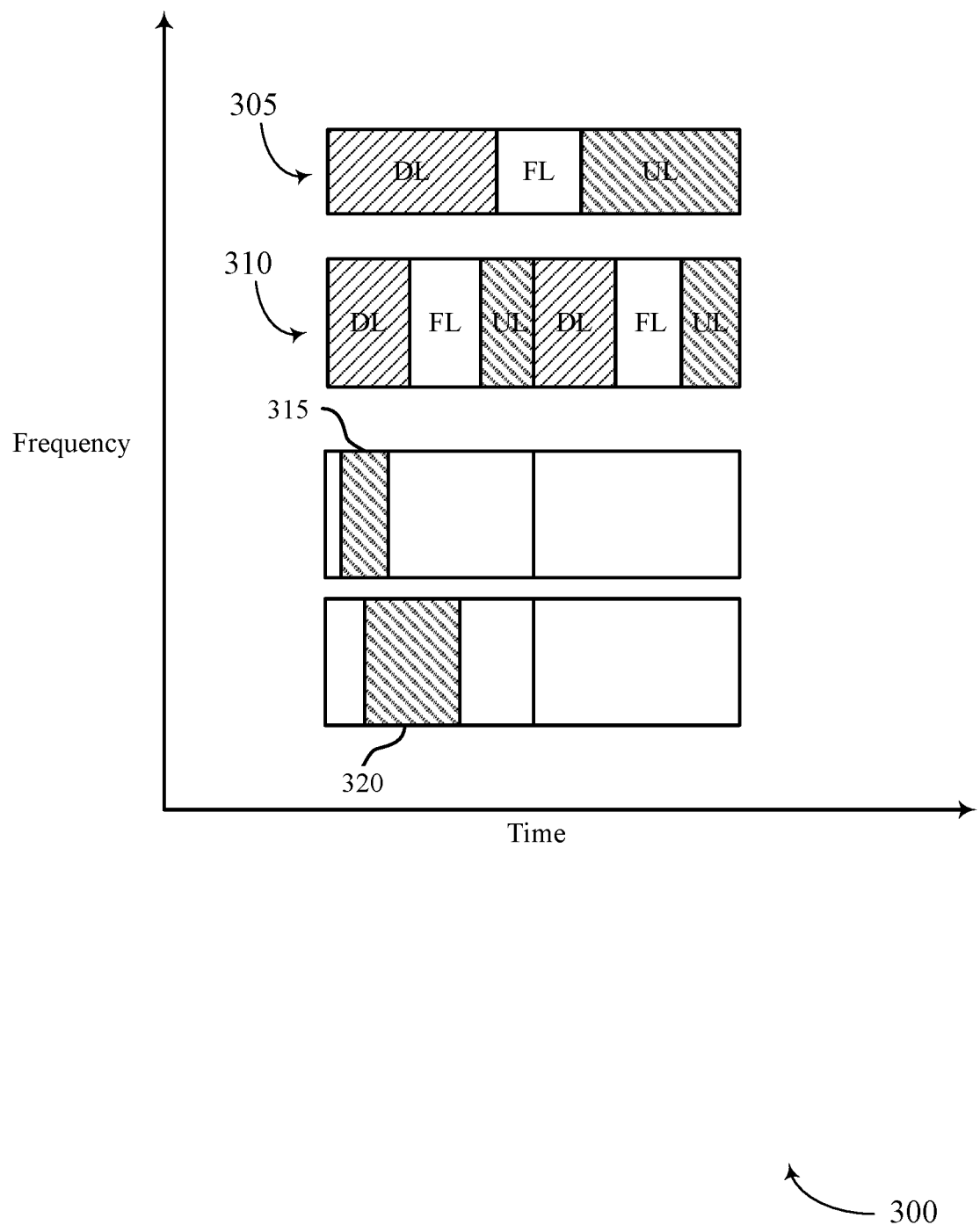
FIG. 3 illustrates an example of an uplink power configuration 300 that supports power control for dual connectivity in accordance with aspects of the present disclosure.

FIG. 3 illustrates an example of an uplink power configuration 300 that supports dual connectivity power control in accordance with aspects of the present disclosure. In some examples, the uplink power configuration 300 may implement aspects of wireless communications system 100 and 200. In the example of FIG. 3, the uplink power configuration 300 may include uplinks by UE 115-*a*, which may be an example of UE 115 of FIG. 1.

As illustrated in the example of FIG. 3, an uplink/downlink pattern 305 may include a downlink symbol, a flexible symbol, and an uplink symbol. Uplink/downlink pattern 310 may include a repeating pattern which may include a downlink symbol, a flexible symbol, and an uplink symbol. The uplink/downlink pattern 305 may represent a pattern for the MCG and may be a first set of CCs using a frequency range of 15 KHz. The uplink/downlink pattern 310 may represent a pattern for the MCG and may be a second set of CCs using a frequency range of 30 KHz. In FIG. 3, the downlink symbol of the uplink/downlink pattern 305 may have a different time duration than the downlink symbol of the uplink/downlink pattern 310. Additionally, in FIG. 3, the uplink/downlink patterns are not drawn to scale.

As previously discussed with respect to the first power control procedure, UE 115-*a* of FIG. 2 may identify the union of all symbols marked as an uplink symbol or a flexible symbol across all CCs of the MCG over a time duration. As illustrated in FIG. 3, the time duration over which UE 115-*a* is identifying the union of symbols is represented by the time duration of uplink 315. Uplink 315 may represent a pattern for the SCG and may be a first set of CCs using a frequency range of 30 KHz. UE 115-*a* may attempt to identify an uplink symbol or a flexible symbol in uplink/downlink patterns 305 and 310 over the time duration of uplink 315, but may not identify a union of these symbols, as only downlink symbols are present in the uplink/downlink patterns 305 and 310 over the relevant time duration. Based on the determination that the uplink on the SCG only overlaps with the semi-static downlink symbols of the MCG, UE 115-a may transmit the uplink on the SCG in accordance with the maximum power configuration P_NR2.

In some examples of the first power control procedure, UE 115-a may attempt to identify an uplink symbol or flexible symbols in uplink/downlink patterns 305 and 310 over the time duration of uplink 320. UE 115-a may fail to identify an semi-static uplink or flexible symbol in the uplink/downlink pattern 305 but may identify a union of the flexible symbol of uplink/downlink pattern 310 with the uplink 320. In some examples, because the flexible symbol of uplink/downlink pattern 310 may be an uplink transmission, it may be treated as an uplink transmission even though it may not yet be determined whether the flexible symbol may be a downlink or an uplink transmission. As a result of the overlapping between the uplink 320 and the flexible symbol of uplink/downlink pattern 310, UE 115-a may not transmit on a symbol of the SCG that is overlapping with the symbol of the MCG that is designated as an uplink symbol.

In some examples of the first power control procedure, the base stations may exchange the semi-static slot format with one another. The MCG may exchange the semi-static slot format with the SCG. Further, for synchronous DC, the second base station for the SCG may manage its uplink transmissions so that the uplink transmissions may not collide with any uplink symbols or flexible symbols of the MCG.

Figure 4:
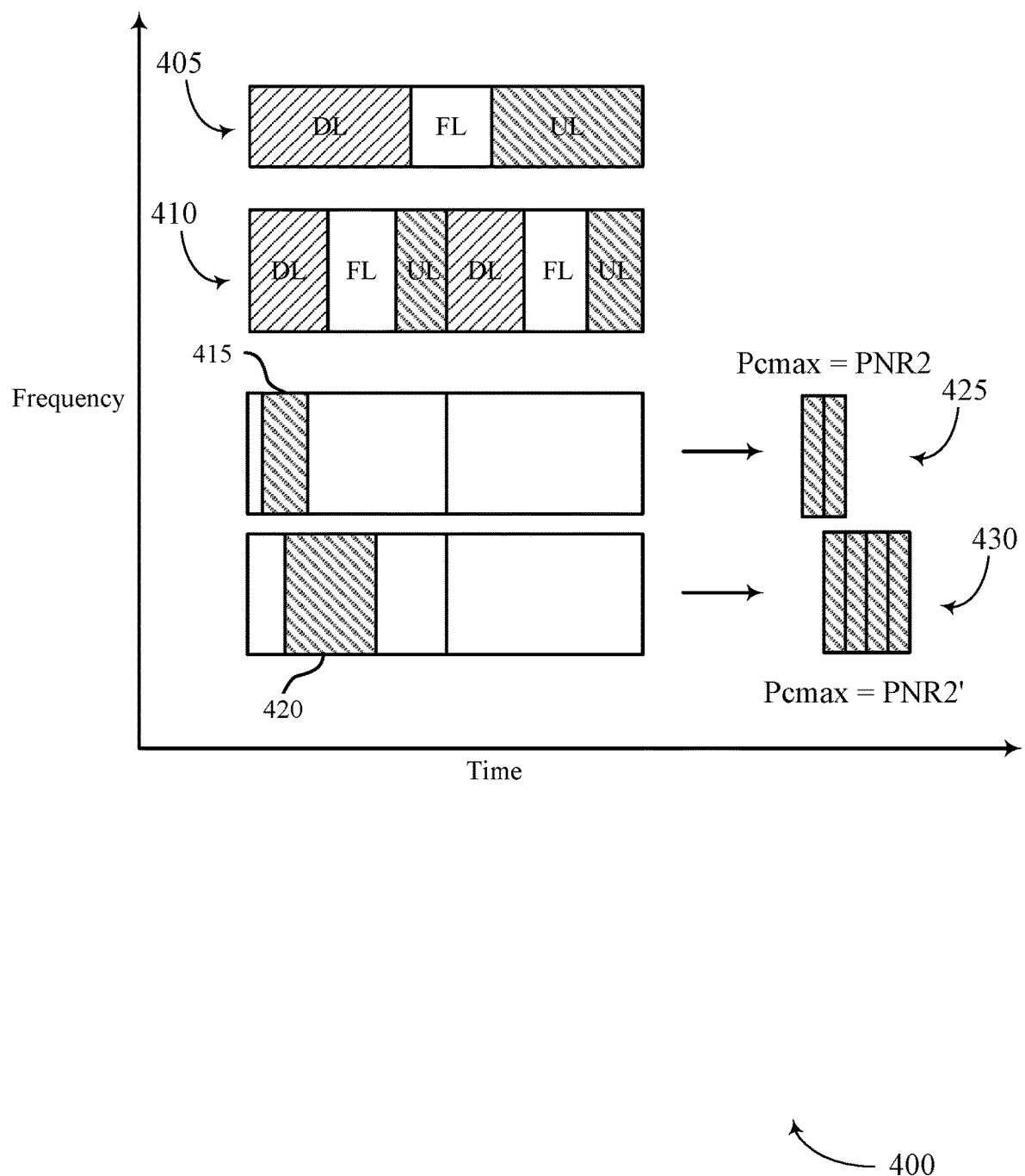
FIG. 4 illustrates an example of an uplink power configuration 400 that supports power control for dual connectivity in accordance with aspects of the present disclosure.

FIG. 4 illustrates an example of an uplink power configuration 400 that supports dual connectivity power control in accordance with aspects of the present disclosure. In some examples, the uplink power configuration 400 may implement aspects of wireless communications system 100 and 200. In the example of FIG. 4, the uplink power configuration 300 may include uplinks by UE 115-a, which may be an example of UE 115 of FIG. 1.

In FIG. 4, the illustrated uplink power procedure may be similar to the second power control procedure discussed with respect to FIG. 2. The second power control procedure includes a first set and a second set of maximum configured powers for the MCG and the SCG. Similar to the discussion of FIG. 2, the first set of maximum configured power may include a maximum configured power for MCG, P_NR1, and a maximum configured power for SCG, P_NR2, in which the sum of P_NR1 and P_NR2 may be equal to or smaller than P_NN. The second set of maximum configured power may include a maximum configured power for MCG, P_NR1', and a maximum configured power for SCG, P_NR2', in which the sum of P_NR1' and P_NR2' may be smaller than P_NN. The second set of maximum configured power may alternatively be r1*P_NR1 and r2*P_NR2, where r1 and r2 may be scalers and set to values such that the sum of r1*P_NR1 and r2*P_NR2 may be less than or equal to P_NN.

As illustrated in the example of FIG. 4 and similar to FIG. 3, an uplink/downlink pattern 405 may include a downlink symbol, a flexible symbol, and an uplink symbol. Also, an uplink/downlink pattern 410 may include a repeating pattern which may include a downlink symbol, a flexible symbol, and an uplink symbol. The uplink/downlink pattern 405 may represent a pattern for the MCG and may be a first set of CCs using a frequency range of 15 KHz. The uplink/downlink pattern 410 may represent a pattern for the MCG and may be a second set of CCs using a frequency range of 30 KHz. In FIG. 4, the downlink symbol of the uplink/downlink pattern 405 may have a different time duration than the downlink symbol of the uplink/downlink pattern 410. Additionally, in FIG. 4, the uplink/downlink patterns are not drawn to scale.

As previously discussed with respect to the second power control procedure, UE 115-a of FIG. 2 (not shown in FIG. 4) may identify the union of all symbols marked as an uplink symbol or a flexible symbol across all CCs of the MCG over a time duration. As illustrated in FIG. 4, the time duration over which UE 115-a is identifying the union of symbols is represented by the time duration of the uplink 415. In some examples, identifying the union of symbols may include identifying partially or fully temporally overlapping uplink symbols between multiple CCs of the MCG and the SCG. Uplink 415 may represent a pattern for the SCG and may be a first set of CCs using a frequency range of 30 KHz. UE 115-a may attempt to identify a union of an uplink symbol or a flexible symbol of the uplink/downlink patterns 405 and 410 with the uplink 415 and over the time duration of uplink 415, but may not identify a union of these symbols, as only downlink symbols are present in the uplink/downlink patterns 405 and 410 over the relevant time duration. When an SCG uplink symbol from the uplink 415 overlaps with a semi-static MCG downlink symbol of the uplink/downlink patterns 405 and 410, the UE maximum allowed power is selected from the first set of maximum configured powers P_NR1 and P_NR2. Accordingly, as illustrated in FIG. 4, uplink 425 may illustrate the UE maximum allowed power may be P_NR2 for the uplink 415 of the MCG. Based on the determination that the uplink on the SCG only overlaps with the semi-static downlink symbols of the MCG, UE 115-a may transmit the uplink on the SCG in accordance with the maximum power configuration P_NR2.

Further to this example of the second power control procedure of FIG. 4, UE 115-a of FIG. 2 may identify the union of all symbols marked as an uplink symbol or a flexible symbol across all CCs of the MCG over a time duration for uplink 420 (which may be in addition to or instead of uplink 425). As illustrated in FIG. 4, the time duration over which UE 115-a is identifying the union of symbols, is represented by the time duration of the uplink 420. In some examples, identifying the union of symbols may include identifying partially or fully temporally overlapping uplink symbols between multiple CCs of the MCG and the SCG.

In some examples the identification of overlapping symbols may be on a symbol-by-symbol basis. In the case that it is symbol-by-symbol, UE 115-a may verify the overlapping symbols of the MCG with the first symbol of the uplink transmission on the MCG. UE 115-a may then set a maximum power and then move to the next symbol, and so forth. Hence different symbol periods may have different maximum allowed powers.

In other examples, the identification of overlapping symbols may be for the entire duration of a transmission on uplink 420. In such case UE 115-a may identify the minimum of the maximum power across all the symbols and may identify minimum as the maximum power for the entire direction of the symbols of transmission on uplink 420 (e.g., similar to the case in which the union is taken over the entire duration of the identified uplink transmission).

Uplink 420 may represent a pattern for the SCG and may be a second set of CCs using a frequency range of 30 KHz. UE 115-a may attempt to identify a union of an uplink symbol or a flexible symbol of the uplink/downlink patterns 405 and 410 with the uplink 420 and over the time duration of uplink 420. In FIG. 4 and as illustrated by uplink 430, UE 115-a may identify a union or overlap of a semi-static flexible symbol of uplink/downlink pattern 410 with the uplink 420. When an SCG uplink symbol from the uplink 415 overlaps with a semi-static MCG semi-static uplink or flexible symbol of the uplink/downlink pattern 410, the UE maximum allowed power is selected from the second set of maximum configured powers P_NR1' and P_NR2'. Accordingly, as illustrated in FIG. 4, uplink 430 may illustrate that the UE maximum allowed power may be P_NR2' for the uplink 420 of the MCG. Based on the determination that the uplink on the SCG overlaps with the semi-static flexible symbol of the MCG, UE 115-a may transmit the uplink on the SCG in accordance with the maximum power configuration P_NR2'.

In some examples, the first cell group and the second cell group for the SCG may be intra-band contiguous. In this case, the second base station for the first cell group may not schedule the uplinks as illustrated by uplink 430 as phase discontinuity may be introduced due to the contiguous bands being used. However, the uplinks may be scheduled as illustrated in uplink 430 by UE 115-a if UE 115-a has look-ahead capability. If UE 115-a uses look-ahead capability, UE 115-a may set the maximum power configuration appropriately to P_NR2' on all symbols of both of the uplink transmissions.

In some examples, the base stations may exchange the semi-static slot format with one another. The MCG may exchange the semi-static slot format with the SCG, and the SCG may exchange the semi-static slot format with the MCG. Further, for synchronous DC, the base stations may manage the uplink transmissions so that the uplink transmissions may not collide with any uplink symbols or flexible symbols of the MCG.

In some examples, the cells (component carriers) of the MCG and SCG may all belong to a single timing advance group (TAG), and UE 115-a in the SCG (or MCG) may verify the semi-statically configured directions for the MCG (or SCG, respectively), as described herein, and select the maximum allowed power for uplink transmissions on the SCG (or MCG, respectively).

In some examples, the cells (component carriers) of the MCG and SCG may belong to different TAGs. For example, although an uplink transmission on a cell of the SCG may only collide with downlink symbols of the MCG, the actual transmission of the MCG may move by the duration of a timing advance, which may then create a collision or overlap because the first TAG (e.g., that includes cells of the MCG) may apply a different timing advance than a second TAG (e.g., that includes cells of the SCG). This may be avoided by only allowing a single TAG. However, this may also be avoided by moving, for each transmission, the uplink and/or flexible symbols of the MCG in time as part of the analysis to determine overlapping uplink and/or flexible symbols. For example, when looking at an uplink transmission on a cell of the SCG, the symbols may be moved either by the timing advance value of other TAG or TAGs of the MCG, or by the maximum timing advances of the other TAGs of the MCG. Then the union may be identified either on a symbol-by-symbol basis, or for the entire uplink transmission duration as discussed herein.

Figure 5:
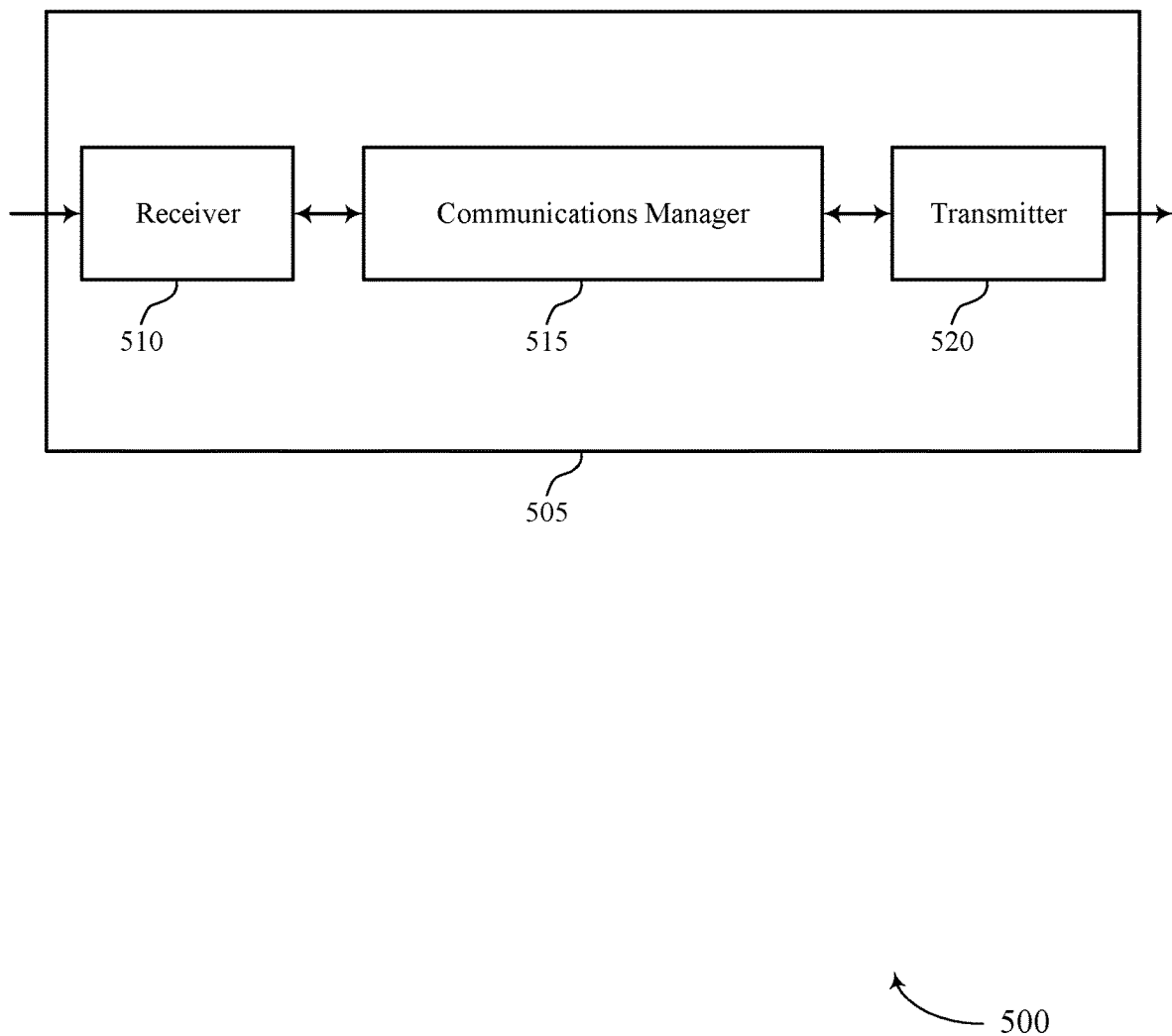
FIGS. 5 and 6 show block diagrams of devices that support power control for dual connectivity in accordance with aspects of the present disclosure.

FIG. 5 shows a block diagram 500 of a device 505 that supports power control for dual connectivity in accordance with aspects of the present disclosure. The device 505 may be an example of aspects of a UE 115 as described herein.

The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink power control for dual connectivity, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a power control configuration for uplink transmissions on a first cell group and on a second cell group, wherein the UE is configured for dual connectivity and to communicate with the first cell group and the second cell group, identify an uplink transmission for one or more symbol periods on a component carrier of the second cell group, determine, for the first cell group, a first configured power level for the one or more symbol periods, and determine, based on the determined first configured power level and the received power control configuration, whether to perform the uplink transmission during the one or more symbol periods on the component carrier of the second cell group. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. One implementation may allow a UE 115 to save power and increase battery life in appropriately coordinating the uplink transmissions in compliance with maximum transmission power requirements. Another implementation may provide improved quality and reliability of service at the UE 115, as the power control schemes described herein may be applicable for NN-DC as opposed to legacy schemes.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
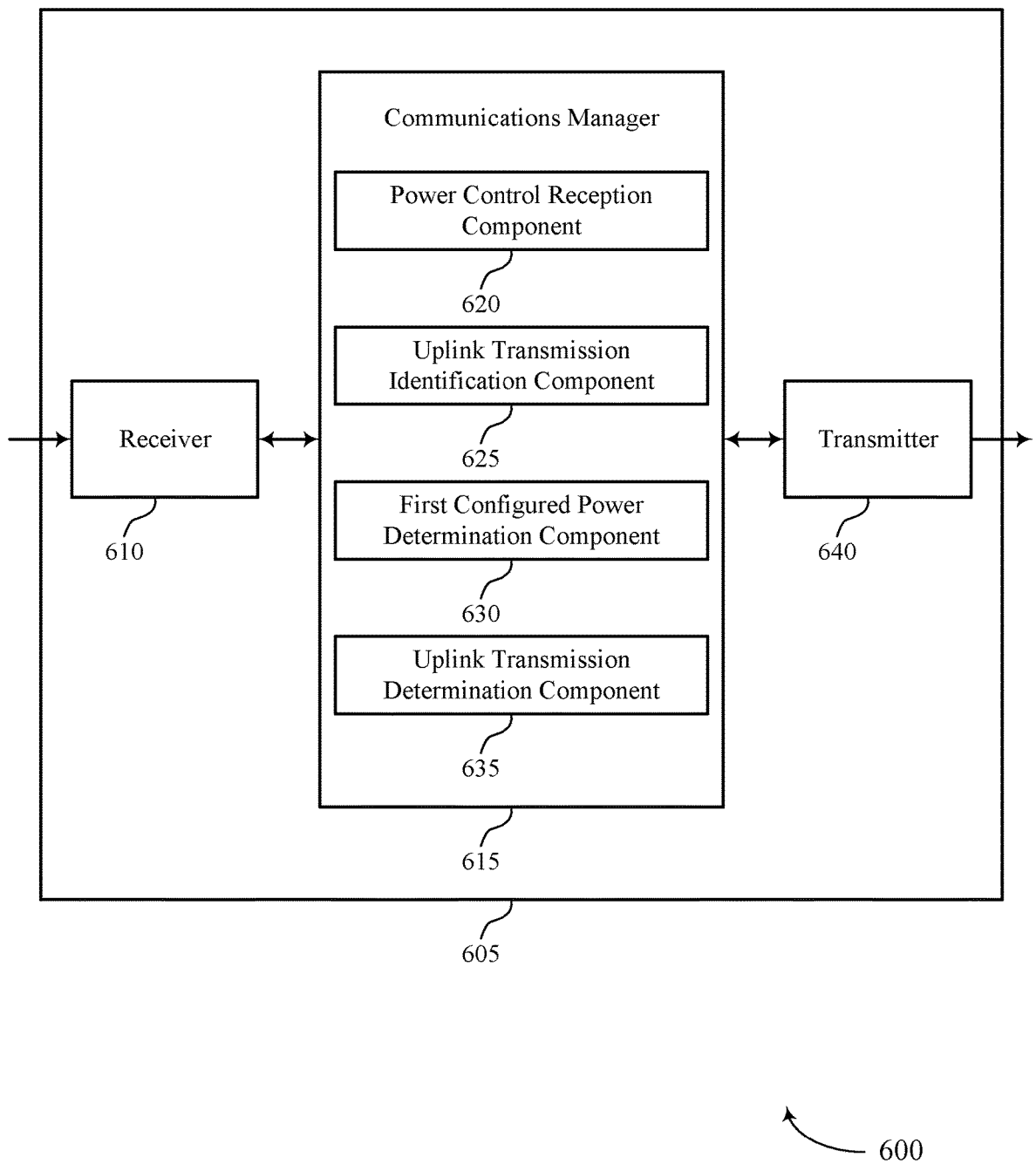

FIG. 6 shows a block diagram 600 of a device 605 that supports power control for dual connectivity in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to uplink power control for dual connectivity, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a power control reception component 620, an uplink transmission identification component 625, a first configured power determination component 630, and an uplink transmission determination component 635. The communications manager 615 may be an example of aspects of the communications manager 810 described herein.

The power control reception component 620 may receive a power control configuration for uplink transmissions on a first cell group and on a second cell group, where the UE is configured to communicate with a first base station on the first cell group and is configured to communicate with a second base station on the second cell group.

The uplink transmission identification component 625 may identify an uplink transmission for one or more symbol periods on a component carrier of the second cell group.

The first configured power determination component 630 may determine, for the first cell group, a first configured power level for the one or more symbol periods.

The uplink transmission determination component 635 may determine, based on the determined first configured power level and the received power control configuration, whether to perform the uplink transmission during the one or more symbol periods on the component carrier of the second cell group.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
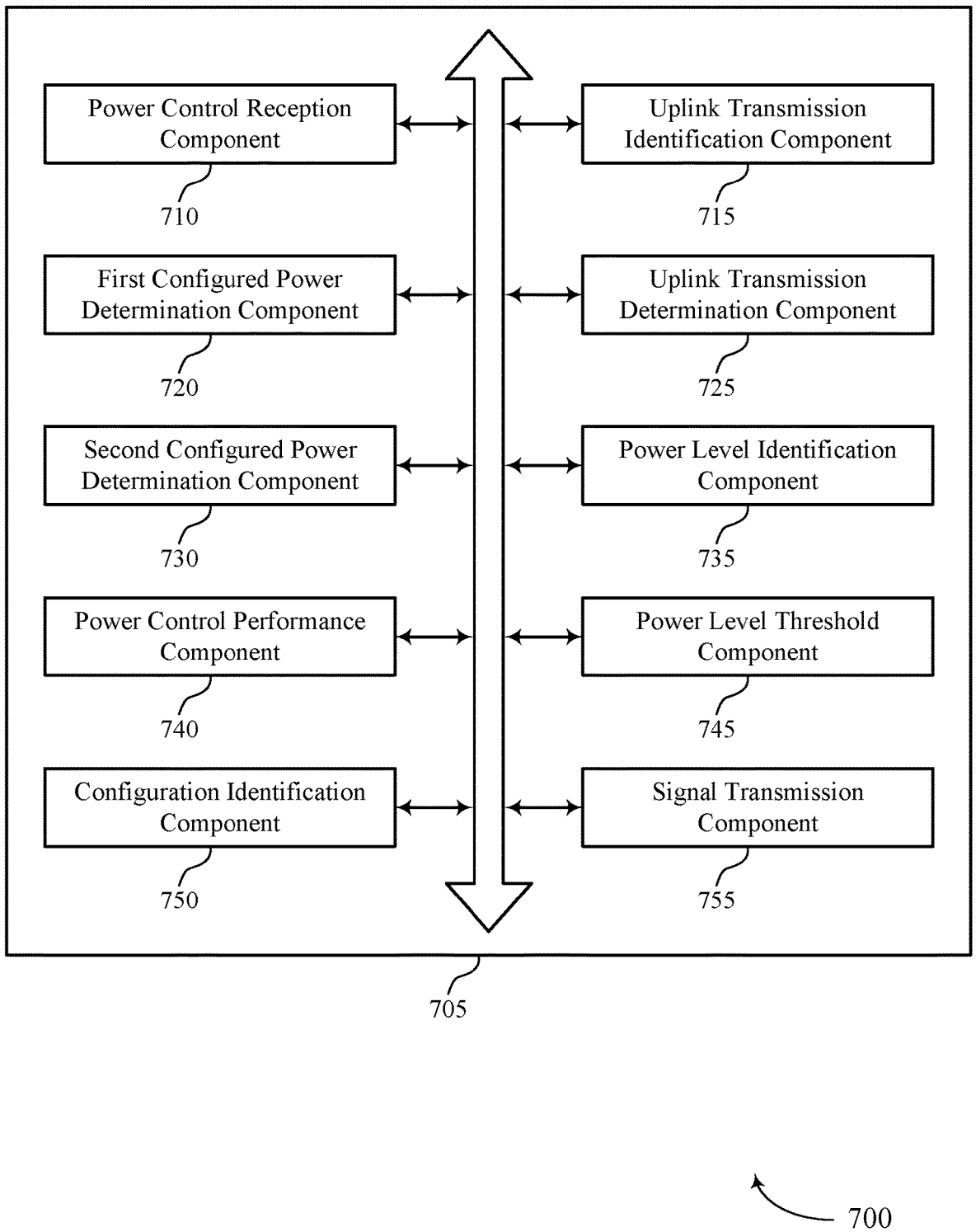
FIG. 7 shows a block diagram of a communications manager that supports power control for dual connectivity in accordance with aspects of the present disclosure.

FIG. 7 shows a block diagram 700 of a communications manager 705 that supports power control for dual connectivity in accordance with aspects of the present disclosure. The communications manager 705 may be an example of aspects of a communications manager 515, a communications manager 615, or a communications manager 810 described herein. The communications manager 705 may include a power control reception component 710, an uplink transmission identification component 715, a first configured power determination component 720, an uplink transmission determination component 725, a second configured power determination component 730, a power level identification component 735, a power control performance component 740, a power level threshold component 745, a configuration identification component 750, and a signal transmission component 755. Each of these modules may communicate, directly or indirectly, with one another (e.g., via one or more buses).

The power control reception component 710 may receive a power control configuration for uplink transmissions on a first cell group and on a second cell group, wherein the UE is configured for dual connectivity and to communicate with the first cell group and the second cell group.

The uplink transmission identification component 715 may identify an uplink transmission for one or more symbol periods on a component carrier of the second cell group.

The first configured power determination component 720 may determine, for the first cell group, a first configured power level for the one or more symbol periods.

The uplink transmission determination component 725 may determine, based on the determined first configured power level and the received power control configuration, whether to perform the uplink transmission during the one or more symbol periods on the component carrier of the second cell group.

In some examples, the uplink transmission determination component 725 may determine to abstain from performing the uplink transmission during the one or more symbol periods based on identifying that one or more symbol periods are indicated as semi-static uplink or flexible during the one or more symbol periods for at least one component carrier of the first cell group.

In some examples, the uplink transmission determination component 725 may determine whether to perform the uplink transmission based on one of the first set of power level thresholds or the second set of power level thresholds, and the determined first configured power level.

In some examples, the uplink transmission determination component 725 may determine that at least one symbol period of the uplink frequency resources of the frequency division duplexing configuration are unavailable for uplink transmissions on the at least one component carrier.

The second configured power determination component 730 may determine a second configured power level for the one or more symbol periods on the second cell group.

The power level identification component 735 may identify that a sum of the determined first configured power level and the determined second configured power level is less than or equal to a power level threshold for the one or more symbol periods.

In some examples, the power level identification component 735 may identify, based on the received power control configuration, a first set of power level thresholds for the first cell group and the second cell group.

In some examples, the power level identification component 735 may identify, based on the received power control configuration, a second set of power level thresholds for the first cell group and the second cell group, where a sum of the first set of power level thresholds is greater than a sum of the second set of power level thresholds.

The power control performance component 740 may perform power control for the second cell group independent of performing power control for the first cell group for the one or more symbol periods. In some examples, the power control performance component 740 may perform power control for the first cell group according to a carrier aggregation power control scheme. Further, in some examples, the power control performance component 740 may perform power control for the second cell group according to the carrier aggregation power control scheme. Additionally, in some examples, the power control performance component 740 may perform power control for one of the first cell group or the second cell group according to the first set of power level thresholds based on identifying zero symbol periods indicated as semi-static uplink or flexible for each component carrier of an other one of the first cell group or the second cell group during the one or more symbol periods.

In some examples, the power control performance component 740 may perform power control for one of the first cell group or the second cell group according to the second set of power level thresholds based on identifying one or more symbol periods indicated as semi-static uplink or flexible for each component carrier of an other one of the first cell group or the second cell group during the one or more symbol periods.

In some cases, a power level threshold component 745 may determine that the first set of power level thresholds corresponding to the first cell group is a same power level threshold as a power level threshold of the second set of power level thresholds for the first cell group.

In some cases, a power level threshold component 745 may determine that the first set of power level thresholds corresponding to the second cell group is a different power level threshold as a power level threshold of the second set of power level thresholds for the second cell group.

The configuration identification component 750 may identify that at least one component carrier of the first cell group is configured according to a frequency division duplexing configuration. In some examples, the configuration identification component 750 may identify a time division duplexing configuration indicating uplink resources for acknowledgment or data channel transmissions on the uplink frequency resources of the at least one component carrier.

The signal transmission component 755 may transmit an acknowledgment or a data channel signal according to the identified time division duplexing configuration.

Figure 8:
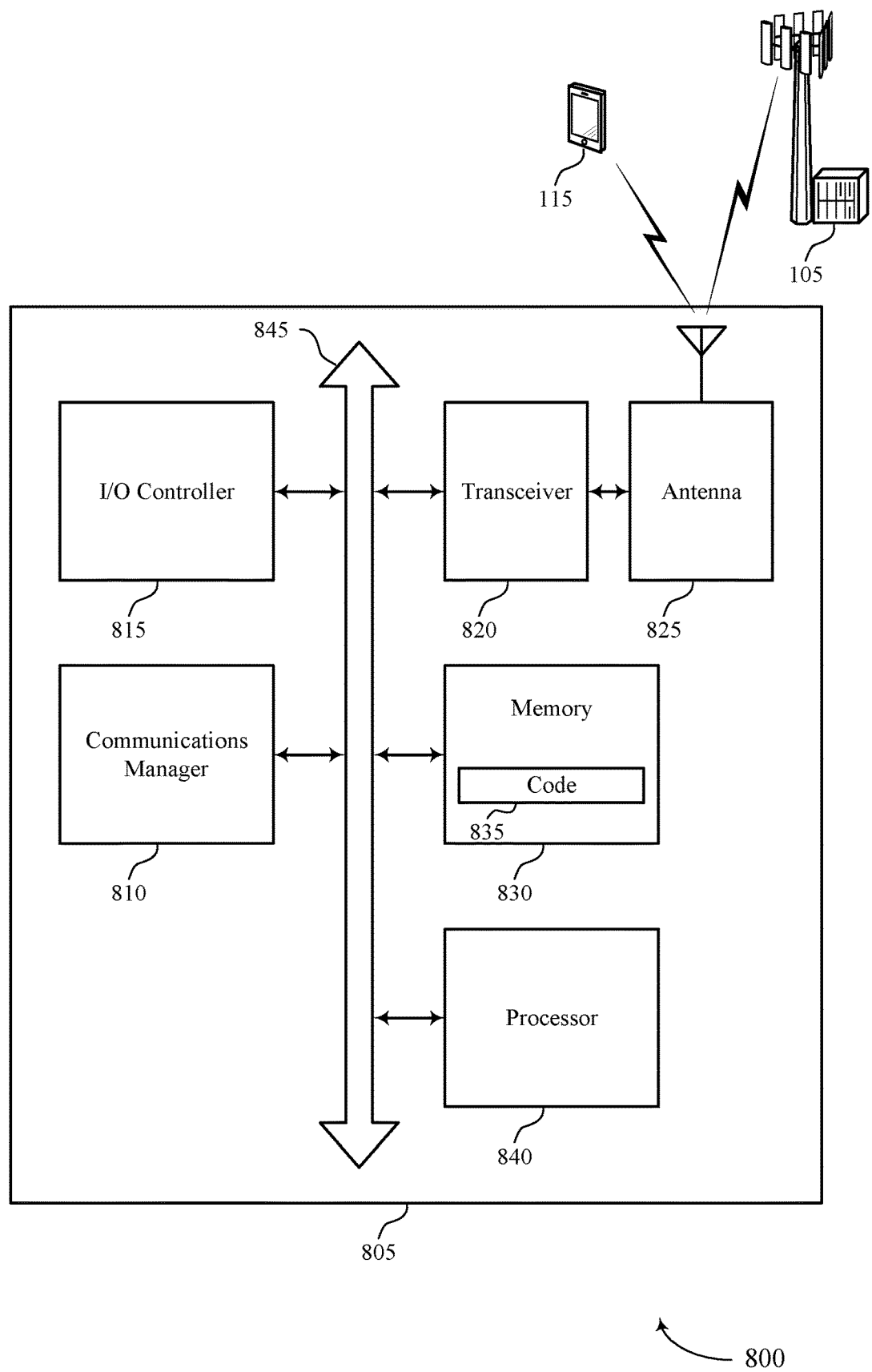
FIG. 8 shows a diagram of a system including a device that supports power control for dual connectivity in accordance with aspects of the present disclosure.

FIG. 8 shows a diagram of a system 800 including a device 805 that supports power control for dual connectivity in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a power control configuration for uplink transmissions on a first cell group and on a second cell group, wherein the UE is configured for dual connectivity and to communicate with the first cell group and the second cell group, identify an uplink transmission for one or more symbol periods on a component carrier of the second cell group, determine, for the first cell group, a first configured power level for the one or more symbol periods, and determine, based on the determined first configured power level and the received power control configuration, whether to perform the uplink transmission during the one or more symbol periods on the component carrier of the second cell group.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink power control for dual connectivity).

Based on uplink power control for dual connectivity, the processor 840 of a UE 115 (e.g., controlling the receiver 510 or 610, the transmitter 520 or 640, or the transceiver 820) may efficiently coordinate uplink transmissions in compliance with maximum transmission power requirements. As such, the processor may be ready to respond more efficiently through the reduction of a ramp up in processing power.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
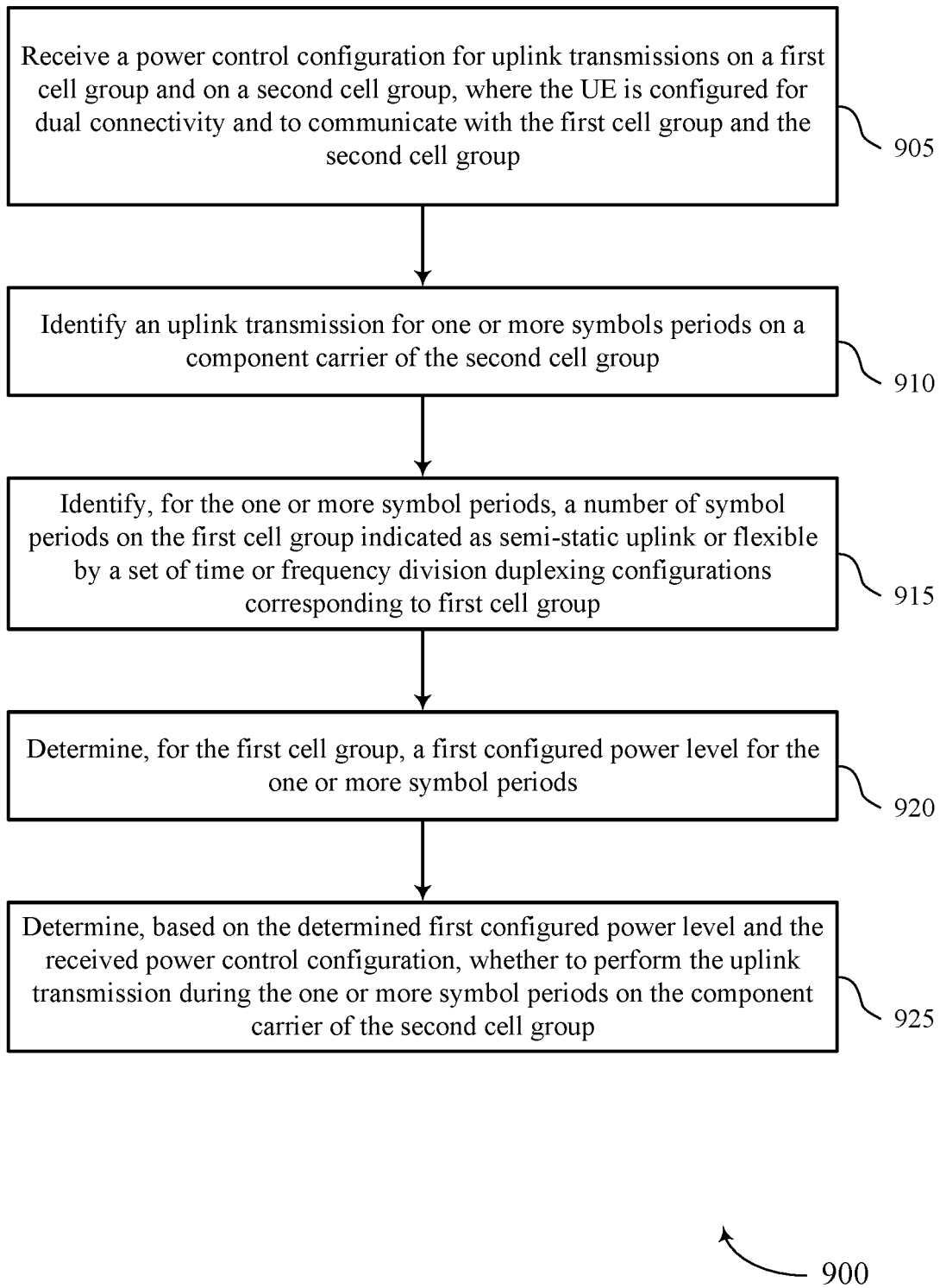
FIGS. 9 through 11 show flowcharts illustrating methods that support power control for dual connectivity in accordance with aspects of the present disclosure.

FIG. 9 shows a flowchart illustrating a method 900 that supports power control for dual connectivity in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive a power control configuration for uplink transmissions on a first cell group and on a second cell group, wherein the UE is configured for dual connectivity and to communicate with the first cell group and the second cell group. The operations of 905 may be performed according to the methods described herein. In some examples, aspects of the operations of 905 may be performed by a power control reception component as described with reference to FIGS. 5 through 8.

At 910, the UE may identify an uplink transmission for one or more symbol periods on a component carrier of the second cell group. The operations of 910 may be performed according to the methods described herein. In some examples, aspects of the operations of 910 may be performed by an uplink transmission identification component as described with reference to FIGS. 5 through 8.

At 915, the UE may identify, for the one or more symbol periods, a number of symbol periods on the first cell group indicated as semi-static uplink or flexible by a set of time or frequency division duplexing configurations corresponding to the first cell group. The operations of 915 may be performed according to the methods described herein. In some examples, aspects of the operations of 915 may be performed by a undefined as described with reference to FIGS. 5 through 8.

At 920, the UE may determine, for the first cell group, a first configured power level for the one or more symbol periods. The operations of 920 may be performed according to the methods described herein. In some examples, aspects of the operations of 920 may be performed by a first configured power determination component as described with reference to FIGS. 5 through 8.

At 925, the UE may determine, based on the determined first configured power level and the received power control configuration, whether to perform the uplink transmission during the one or more symbol periods on the component carrier of the second cell group. The operations of 925 may be performed according to the methods described herein. In some examples, aspects of the operations of 925 may be performed by an uplink transmission determination component as described with reference to FIGS. 5 through 8.

Figure 10:
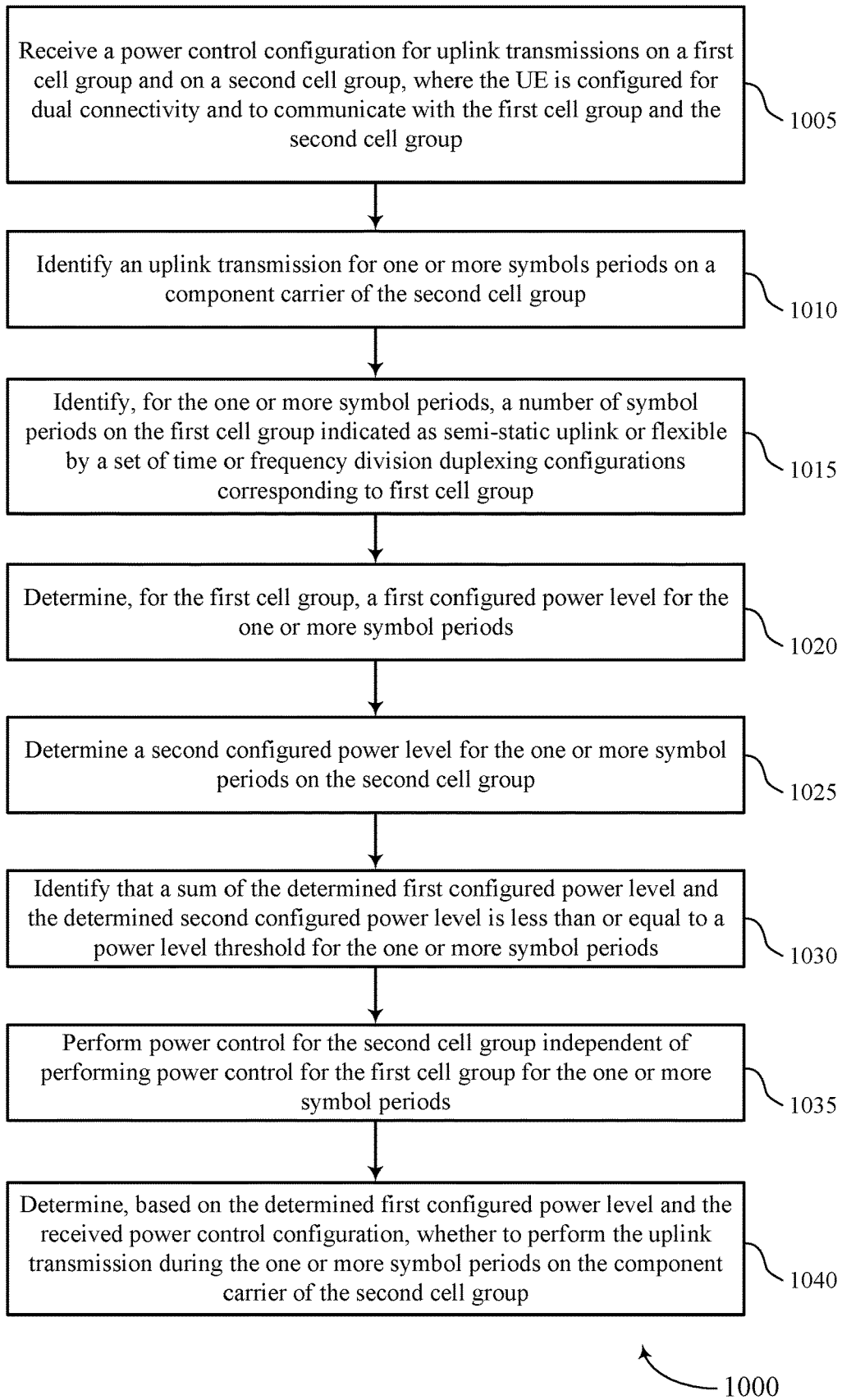

FIG. 10 shows a flowchart illustrating a method 1000 that supports power control for dual connectivity in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive a power control configuration for uplink transmissions on a first cell group and on a second cell group, wherein the UE is configured for dual connectivity and to communicate with the first cell group and the second cell group. The operations of 1005 may be performed according to the methods described herein. In some examples, aspects of the operations of 1005 may be performed by a power control reception component as described with reference to FIGS. 5 through 8.

At 1010, the UE may identify an uplink transmission for one or more symbol periods on a component carrier of the second cell group. The operations of 1010 may be performed according to the methods described herein. In some examples, aspects of the operations of 1010 may be performed by an uplink transmission identification component as described with reference to FIGS. 5 through 8.

At 1015, the UE may identify, for the one or more symbol periods, a number of symbol periods on the first cell group indicated as semi-static uplink or flexible by a set of time or frequency division duplexing configurations corresponding to the first cell group. The operations of 1015 may be performed according to the methods described herein. In some examples, aspects of the operations of 1015 may be performed by a undefined as described with reference to FIGS. 5 through 8.

At 1020, the UE may determine, for the first cell group, a first configured power level for the one or more symbol periods. The operations of 1020 may be performed according to the methods described herein. In some examples, aspects of the operations of 1020 may be performed by a first configured power determination component as described with reference to FIGS. 5 through 8.

At 1025, the UE may determine a second configured power level for the one or more symbol periods on the second cell group. The operations of 1025 may be performed according to the methods described herein. In some examples, aspects of the operations of 1025 may be performed by a second configured power determination component as described with reference to FIGS. 5 through 8.

At 1030, the UE may identify that a sum of the determined first configured power level and the determined second configured power level is less than or equal to a power level threshold for the one or more symbol periods. The operations of 1030 may be performed according to the methods described herein. In some examples, aspects of the operations of 1030 may be performed by a power level identification component as described with reference to FIGS. 5 through 8.

At 1035, the UE may perform power control for the second cell group independent of performing power control for the first cell group for the one or more symbol periods. The operations of 1035 may be performed according to the methods described herein. In some examples, aspects of the operations of 1035 may be performed by a power control performance component as described with reference to FIGS. 5 through 8.

At 1040, the UE may determine, based on the determined first configured power level and the received power control configuration, whether to perform the uplink transmission during the one or more symbol periods on the component carrier of the second cell group. The operations of 1040 may be performed according to the methods described herein. In some examples, aspects of the operations of 1040 may be performed by an uplink transmission determination component as described with reference to FIGS. 5 through 8.

Figure 11:
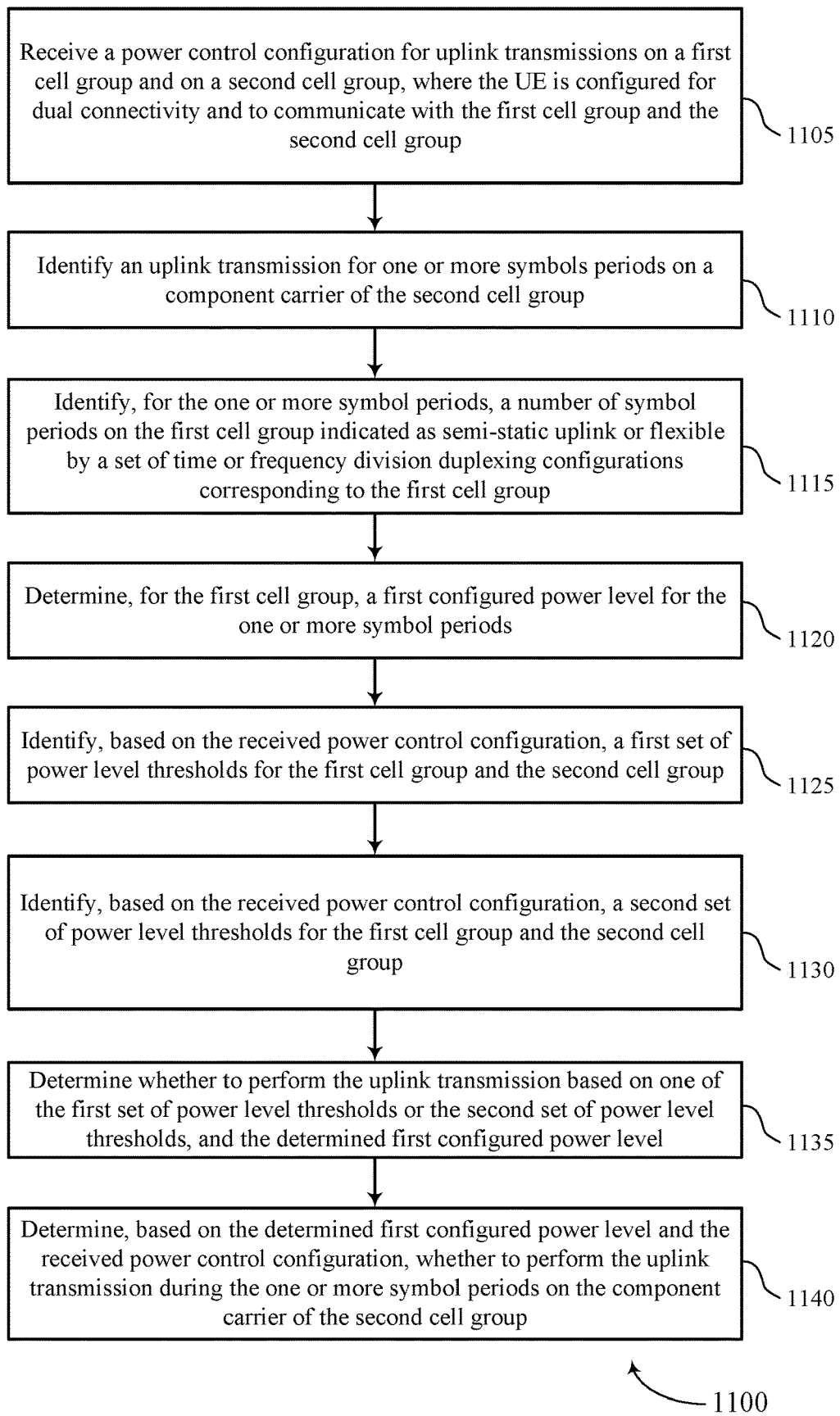

FIG. 11 shows a flowchart illustrating a method 1100 that supports power control for dual connectivity in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive a power control configuration for uplink transmissions on a first cell group and on a second cell group, wherein the UE is configured for dual connectivity and to communicate with the first cell group and the second cell group. The operations of 1105 may be performed according to the methods described herein. In some examples, aspects of the operations of 1105 may be performed by a power control reception component as described with reference to FIGS. 5 through 8.

At 1110, the UE may identify an uplink transmission for one or more symbol periods on a component carrier of the second cell group. The operations of 1110 may be performed according to the methods described herein. In some examples, aspects of the operations of 1110 may be performed by an uplink transmission identification component as described with reference to FIGS. 5 through 8.

At 1115, the UE may identify, for the one or more symbol periods, a number of symbol periods on the first cell group indicated as semi-static uplink or flexible by a set of time or frequency division duplexing configurations corresponding to the first cell group. The operations of 1115 may be performed according to the methods described herein. In some examples, aspects of the operations of 1115 may be performed by a undefined as described with reference to FIGS. 5 through 8.

At 1120, the UE may determine, for the first cell group, a first configured power level for the one or more symbol periods. The operations of 1120 may be performed according to the methods described herein. In some examples, aspects of the operations of 1120 may be performed by a first configured power determination component as described with reference to FIGS. 5 through 8.

At 1125, the UE may identify, based on the received power control configuration, a first set of power level thresholds for the first cell group and the second cell group. The operations of 1125 may be performed according to the methods described herein. In some examples, aspects of the operations of 1125 may be performed by a power level identification component as described with reference to FIGS. 5 through 8.

At 1130, the UE may identify, based on the received power control configuration, a second set of power level thresholds for the first cell group and the second cell group, where a sum of the first set of power level thresholds is greater than a sum of the second set of power level thresholds. The operations of 1130 may be performed according to the methods described herein. In some examples, aspects of the operations of 1130 may be performed by a power level identification component as described with reference to FIGS. 5 through 8.

At 1135, the UE may determine whether to perform the uplink transmission based on one of the first set of power level thresholds or the second set of power level thresholds, and the determined first configured power level. The operations of 1135 may be performed according to the methods described herein. In some examples, aspects of the operations of 1135 may be performed by an uplink transmission determination component as described with reference to FIGS. 5 through 8.

At 1140, the UE may determine, based on the determined first configured power level and the received power control configuration, whether to perform the uplink transmission during the one or more symbol periods on the component carrier of the second cell group. The operations of 1140 may be performed according to the methods described herein. In some examples, aspects of the operations of 1140 may be performed by an uplink transmission determination component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
  receiving a power control configuration for uplink transmissions on a first cell group and on a second cell group, wherein the UE is configured for dual connectivity in a same radio access technology (RAT) and to communicate with at least one component carrier of the first cell group in the same RAT and a component carrier of the second cell group in the same RAT;

identifying an uplink transmission for one or more symbol periods on the component carrier of the second cell group;

identifying, for the one or more symbol periods, a set of time or frequency division duplexing configurations corresponding to the first cell group;

determining, for the first cell group, a first configured power level for the one or more symbol periods, wherein the first configured power level is determined according to a first maximum power level threshold based at least in part on zero symbol periods indicated as semi-static uplink or flexible for the at least one component carrier of the first cell group by the set of time or frequency division duplexing configurations during the one or more symbol periods and according to a second maximum power level threshold different from the first maximum power level threshold based at least in part on at least one symbol period indicated as semi-static uplink or flexible for the at least one component carrier of the first cell group by the set of time or frequency division duplexing configurations during the one or more symbol periods; and performing, based at least in part on the determined first configured power level and the received power control configuration, the uplink transmission during the one or more symbol periods on the component carrier of the second cell group.

2. The method of claim 1, further comprising:
determining a second configured power level for the one or more symbol periods on the second cell group;

identifying that a sum of the determined first configured power level and the determined second configured power level is less than or equal to a power level threshold for the one or more symbol periods; and performing power control for the second cell group independent of performing power control for the first cell group for the one or more symbol periods.

3. The method of claim 2, wherein performing power control for the second cell group independent of performing power control for the first cell group for the one or more symbol periods comprises:

performing power control for the first cell group according to a carrier aggregation power control scheme; or performing power control for the second cell group according to the carrier aggregation power control scheme; or a combination thereof.

4. The method of claim 1, wherein:
the first maximum power level threshold corresponds to a first set of power level thresholds and the second maximum power level threshold corresponds to a second set of power level thresholds, the first set and second set of power level thresholds being indicated by the received power control configuration.

5. The method of claim 4, further comprising:
performing power control for the second cell group according to the first set of power level thresholds based at least in part on identifying zero symbol periods indicated as semi-static uplink or flexible for the at least one component carrier of the first cell group by the set of time or frequency division duplexing configurations during the one or more symbol periods.

6. The method of claim 4, further comprising:
performing power control for the second cell group according to the second set of power level thresholds based at least in part on identifying at least one symbol period indicated as semi-static uplink or flexible for the at least one component carrier of the first cell group by the set of time or frequency division duplexing configurations during the one or more symbol periods.

7. The method of claim 4, wherein:
the first set of power level thresholds comprises the first maximum power level threshold for the first cell group and a first maximum power level threshold for the second cell group, and wherein the second set of power level thresholds comprises the second maximum power level threshold for the first cell group and a second maximum power level threshold for the second cell group.

8. The method of claim 7, wherein a sum of the first maximum power level threshold for the first cell group and the first maximum power level threshold for the second cell group does not exceed a maximum power for the UE.

9. The method of claim 7, wherein the first maximum power level threshold for the first cell group and the first maximum power level threshold for the second cell group are identified based at least in part on identifying at least one symbol period indicated as semi-static uplink or flexible.

10. The method of claim 1, further comprising:
identifying that the at least one component carrier of the first cell group is configured according to a frequency division duplexing configuration; and determining that at least one symbol period of uplink frequency resources of the frequency division duplexing configuration are unavailable for uplink transmissions on the at least one component carrier.

11. The method of claim 10, further comprising:
identifying a time division duplexing configuration indicating uplink resources for acknowledgment or data channel transmissions on the uplink frequency resources of the at least one component carrier; and transmitting an acknowledgment or a data channel signal according to the identified time division duplexing configuration.

12. The method of claim 1, wherein the first cell group comprises a master cell group, and the second cell group comprises a secondary cell group.

13. The method of claim 1, wherein the first cell group and the second cell group are in a same radio frequency spectrum band, wherein the at least one component carrier of the first cell group comprises a first component carrier and a second component carrier having a subcarrier spacing different from a subcarrier spacing of the first component carrier.

14. An apparatus for wireless communication at a user equipment (UE), comprising:
at least one processor; and
memory coupled to the at least one processor, the memory storing instructions executable by the at least one processor to cause the UE to:
receive a power control configuration for uplink transmissions on a first cell group and on a second cell group, wherein the UE is configured for dual connectivity in a same radio access technology (RAT) and to communicate with at least one component carrier of the first cell group in the same RAT and a component carrier of the second cell group in the same RAT;

identify an uplink transmission for one or more symbol periods on the component carrier of the second cell group;

identify, for the one or more symbol periods, a set of time or frequency division duplexing configurations corresponding to the first cell group;

determine, for the first cell group, a first configured power level for the one or more symbol periods, wherein the first configured power level is determined according to a first maximum power level threshold based at least in part on zero symbol periods indicated as semi-static uplink or flexible for the at least one component carrier of the first cell group by the set of time or frequency division duplexing configurations during the one or more symbol periods and according to a second maximum power level threshold different from the first maximum power level threshold based at least in part on at least one symbol period indicated as semi-static uplink or flexible for the at least one component carrier of the first cell group by the set of time or frequency division duplexing configurations during the one or more symbol periods; and perform, based at least in part on the determined first configured power level and the received power control configuration, the uplink transmission during the one or more symbol periods on the component carrier of the second cell group.

15. The apparatus of claim 14, wherein the instructions are further executable by the at least one processor to cause the UE to:
determine a second configured power level for the one or more symbol periods on the second cell group;
identify that a sum of the determined first configured power level and the determined second configured power level is less than or equal to a power level threshold for the one or more symbol periods; and
perform power control for the second cell group independent of performing power control for the first cell group for the one or more symbol periods.

16. The apparatus of claim 15, wherein the instructions to perform power control for the second cell group independent of performing power control for the first cell group for the one or more symbol periods are executable by the at least one processor to cause the UE to:
perform power control for the first cell group according to a carrier aggregation power control scheme; or
perform power control for the second cell group according to the carrier aggregation power control scheme; or a combination thereof.

17. The apparatus of claim 14, wherein the first maximum power level threshold corresponds to a first set of power level thresholds and the second maximum power level threshold corresponds to a second set of power level thresholds, the first set and second set of power level thresholds being indicated by the received power control configuration.

18. The apparatus of claim 17, wherein the instructions are further executable by the at least one processor to cause the UE to:
perform power control for the second cell group according to the first set of power level thresholds based at least in part on identifying zero symbol periods indicated as semi-static uplink or flexible for the at least one component carrier of the first cell group by the set of time or frequency division duplexing configurations during the one or more symbol periods.

19. The apparatus of claim 17, wherein the instructions are further executable by the at least one processor to cause the UE to:
perform power control for the second cell group according to the second set of power level thresholds based at least in part on identifying at least one symbol period indicated as semi-static uplink or flexible for the at least one component carrier of an other one of the first cell group by the set of time or frequency division duplexing configurations during the one or more symbol periods.

20. The apparatus of claim 17, wherein:
the first set of power level thresholds comprises the first maximum power level threshold for the first cell group and a first maximum power level threshold for the second cell group, and wherein the second set of power level thresholds comprises the second maximum power level threshold for the first cell group and a second maximum power level threshold for the second cell group.

21. The apparatus of claim 20, wherein a sum of the first maximum power level threshold for the first cell group and the first maximum power level threshold for the second cell group does not exceed a maximum power for the UE.

22. The apparatus of claim 20, wherein the first maximum power level threshold for the first cell group and the first maximum power level threshold for the second cell group are identified based at least in part on identifying at least one symbol period indicated as semi-static uplink or flexible.

23. The apparatus of claim 14, wherein the instructions are further executable by the at least one processor to cause the UE to:
identify that at least one component carrier of the first cell group is configured according to a frequency division duplexing configuration; and
determine that the at least one symbol period of uplink frequency resources of the frequency division duplexing configuration are unavailable for uplink transmissions on the at least one component carrier.

24. The apparatus of claim 23, wherein the instructions are further executable by the at least one processor to cause the UE to:
identify a time division duplexing configuration indicating uplink resources for acknowledgment or data channel transmissions on the uplink frequency resources of the at least one component carrier; and
transmit an acknowledgment or a data channel signal according to the identified time division duplexing configuration.

25. The apparatus of claim 14, wherein the first cell group comprises a master cell group, and the second cell group comprises a secondary cell group.

26. The apparatus of claim 14, wherein the first cell group and the second cell group are in a same radio frequency spectrum band, wherein the at least one component carrier of the first cell group comprises a first component carrier and a second component carrier having a subcarrier spacing different from a subcarrier spacing of the first component carrier.

27. An apparatus for wireless communication at a user equipment (UE), comprising:
means for receiving a power control configuration for uplink transmissions on a first cell group and on a second cell group, wherein the UE is configured for dual connectivity in a same radio access technology (RAT) and to communicate with at least one component carrier of the first cell group in the same RAT and a component carrier of the second cell group in the same RAT;
means for identifying an uplink transmission for one or more symbol periods on the component carrier of the second cell group;

means for identifying, for the one or more symbol periods, a set of time or frequency division duplexing configurations corresponding to the first cell group;

means for determining, for the first cell group, a first configured power level for the one or more symbol periods, wherein the first configured power level is determined according to a first maximum power level threshold based at least in part on zero symbol periods indicated as semi-static uplink or flexible for the at least one component carrier of the first cell group by the set of time or frequency division duplexing configurations during the one or more symbol periods and according to a second maximum power level threshold different from the first maximum power level threshold based at least in part on at least one symbol period indicated as semi-static uplink or flexible for the at least one component carrier of the first cell group by the set of time or frequency division duplexing configurations during the one or more symbol periods; and means for performing, based at least in part on the determined first configured power level and the received power control configuration, the uplink transmission during the one or more symbol periods on the component carrier of the second cell group.

28. The apparatus of claim 27, further comprising:
means for determining a second configured power level for the one or more symbol periods on the second cell group;
means for identifying that a sum of the determined first configured power level and the determined second configured power level is less than or equal to a power level threshold for the one or more symbol periods; and
means for performing power control for the second cell group independent of performing power control for the first cell group for the one or more symbol periods.

29. The apparatus of claim 28, wherein the means for performing power control for the second cell group independent of performing power control for the first cell group for the one or more symbol periods comprises:
means for performing power control for the first cell group according to a carrier aggregation power control scheme; or
means for performing power control for the second cell group according to the carrier aggregation power control scheme; or
a combination thereof.

30. The apparatus of claim 27, wherein:
the first maximum power level threshold corresponds to a first set of power level thresholds and the second maximum power level threshold corresponds to a second set of power level thresholds, the first set and second set of power level thresholds being indicated by the received power control configuration.

31. The apparatus of claim 30, further comprising:
means for performing power control for the second cell group according to the first set of power level thresholds based at least in part on identifying zero symbol periods indicated as semi-static uplink or flexible for each the at least one component carrier of the first cell group by the set of time or frequency division duplexing configurations during the one or more symbol periods.

32. The apparatus of claim 30, further comprising:
means for performing power control for the second cell group according to the second set of power level thresholds based at least in part on identifying at least one symbol period indicated as semi-static uplink or flexible for the at least one component carrier of the first cell group by the set of time or frequency division duplexing configurations during the one or more symbol periods.

33. The apparatus of claim 30, wherein:
the first set of power level thresholds comprises the first maximum power level threshold for the first cell group and a first maximum power level threshold for the second cell group, and wherein the second set of power level thresholds comprises the second maximum power level threshold for the first cell group and a second maximum power level threshold for the second cell group.

34. The apparatus of claim 33, wherein a sum of the first maximum power level threshold for the first cell group and the first maximum power level threshold for the second cell group does not exceed a maximum power for the UE.

35. The apparatus of claim 33, wherein the first maximum power level threshold for the first cell group and the first maximum power level threshold for the second cell group are identified based at least in part on identifying at least one symbol period indicated as semi-static uplink or flexible.

36. The apparatus of claim 27, further comprising:
means for identifying that the at least one component carrier of the first cell group is configured according to a frequency division duplexing configuration; and
means for determining that at least one symbol period of uplink frequency resources of the frequency division duplexing configuration are unavailable for uplink transmissions on the at least one component carrier.

37. The apparatus of claim 36, further comprising:
means for identifying a time division duplexing configuration indicating uplink resources for acknowledgment or data channel transmissions on the uplink frequency resources of the at least one component carrier; and
means for transmitting an acknowledgment or a data channel signal according to the identified time division duplexing configuration.

38. The apparatus of claim 27, wherein the first cell group comprises a master cell group, and the second cell group comprises a secondary cell group.

39. The apparatus of claim 27, wherein the first cell group and the second cell group are in a same radio frequency spectrum band, wherein the at least one component carrier of the first cell group comprises a first component carrier and a second component carrier having a subcarrier spacing different from a subcarrier spacing of the first component carrier.

40. A non-transitory computer-readable medium storing code for wireless communication at a user equipment (UE), the code comprising instructions executable by at least one processor to:
receive a power control configuration for uplink transmissions on a first cell group and on a second cell group, wherein the UE is configured for dual connectivity in a same radio access technology (RAT) and to communicate with at least one component carrier of the first cell group in the same RAT and a component carrier of the second cell group in the same RAT;
identify an uplink transmission for one or more symbol periods on the component carrier of the second cell group;
identify, for the one or more symbol periods, by a set of time or frequency division duplexing configurations corresponding to the first cell group;
determine, for the first cell group, a first configured power level for the one or more symbol periods, wherein the first configured power level is determined according to a first maximum power level threshold based at least in part on zero symbol periods indicated as semi-static uplink or flexible for the at least one component carrier of the first cell group by the set of time or frequency division duplexing configurations during the one or more symbol periods and according to a second maximum power level threshold different from the first maximum power level threshold based at least in part on at least one symbol period indicated as semi-static uplink or flexible for the at least one component carrier of the first cell group by the set of time or frequency division duplexing configurations during the one or more symbol periods; and perform, based at least in part on the determined first configured power level and the received power control configuration, the uplink transmission during the one or more symbol periods on the component carrier of the second cell group.

41. The non-transitory computer-readable medium of claim 40, wherein the instructions are further executable to:
determine a second configured power level for the one or more symbol periods on the second cell group;
identify that a sum of the determined first configured power level and the determined second configured power level is less than or equal to a power level threshold for the one or more symbol periods; and
perform power control for the second cell group independent of performing power control for the first cell group for the one or more symbol periods.

42. The non-transitory computer-readable medium of claim 41, wherein the instructions to perform power control for the second cell group independent of performing power control for the first cell group for the one or more symbol periods are executable to:
perform power control for the first cell group according to a carrier aggregation power control scheme; or
perform power control for the second cell group according to the carrier aggregation power control scheme; or a combination thereof.

43. The non-transitory computer-readable medium of claim 40, wherein the the first maximum power level threshold corresponds to a first set of power level thresholds and the second maximum power level threshold corresponds to a second set of power level thresholds, the first set and second set of power level thresholds being indicated by the received power control configuration.

44. The non-transitory computer-readable medium of claim 43, wherein the instructions are further executable to:
perform power control for the second cell group according to the first set of power level thresholds based at least in part on identifying zero symbol periods indicated as semi-static uplink or flexible for the at least one component carrier of the first cell group by the set of time or frequency division duplexing configurations during the one or more symbol periods.

45. The non-transitory computer-readable medium of claim 43, wherein the instructions are further executable to:

perform power control for the second cell group according to the second set of power level thresholds based at least in part on identifying at least one symbol period indicated as semi-static uplink or flexible for the at least one component carrier of the first cell group by the set of time or frequency division duplexing configurations during the one or more symbol periods.

46. The non-transitory computer-readable medium of claim 43, wherein:
the first set of power level thresholds comprises the first maximum power level threshold for the first cell group and a first maximum power level threshold for the second cell group, and wherein the second set of power level thresholds comprises the second maximum power level threshold for the first cell group and a second maximum power level threshold for the second cell group.

47. The non-transitory computer-readable medium of claim 46, wherein a sum of the first maximum power level threshold for the first cell group and the first maximum power level threshold for the second cell group does not exceed a maximum power for the UE.

48. The non-transitory computer-readable medium of claim 46, wherein the first maximum power level threshold for the first cell group and the first maximum power level threshold for the second cell group are identified based at least in part on identifying at least one symbol period indicated as semi-static uplink or flexible.

49. The non-transitory computer-readable medium of claim 40, wherein the instructions are further executable to:
identify that the at least one component carrier of the first cell group is configured according to a frequency division duplexing configuration; and
determine that at least one symbol period of uplink frequency resources of the frequency division duplexing configuration are unavailable for uplink transmissions on the at least one component carrier.

50. The non-transitory computer-readable medium of claim 49, wherein the instructions are further executable to:
identify a time division duplexing configuration indicating uplink resources for acknowledgment or data channel transmissions on the uplink frequency resources of the at least one component carrier; and
transmit an acknowledgment or a data channel signal according to the identified time division duplexing configuration.

51. The non-transitory computer-readable medium of claim 40, wherein the first cell group comprises a master cell group, and the second cell group comprises a secondary cell group.

52. The non-transitory computer-readable medium of claim 40, wherein the first cell group and the second cell group are in a same radio frequency spectrum band, wherein the at least one component carrier of the first cell group comprises a first component carrier and a second component carrier having a subcarrier spacing different from a subcarrier spacing of the first component carrier.

* * * * *